(12) United States Patent
Sedlar et al.

(10) Patent No.: US 8,335,775 B1
(45) Date of Patent: Dec. 18, 2012

(54) VERSIONING IN INTERNET FILE SYSTEM

(75) Inventors: Eric Sedlar, San Francisco, CA (US);
Michael J. Roberts, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 547 days.

(21) Appl. No.: 09/571,696

(22) Filed: May 15, 2000

Related U.S. Application Data

(60) Provisional application No. 60/147,538, filed on Aug. 5, 1999.

(51) Int. Cl.
*G06F 7/00* (2006.01)
*G06F 17/00* (2006.01)

(52) U.S. Cl. ......... 707/695; 707/639; 707/809; 715/229

(58) Field of Classification Search ............ 707/1–4, 707/8–10, 100–104.1, 200–205, 500, 511, 707/695, 638, 809; 711/100, 120–122; 717/100, 717/120–123, 168–170; 715/500, 511, 229
See application file for complete search history.

(56) References Cited

U.S. PATENT DOCUMENTS

| | | | |
|---|---|---|---|
| 4,558,413 A * | 12/1985 | Schmidt et al. | 717/170 |
| 5,047,918 A * | 9/1991 | Schwartz et al. | 707/203 |
| 5,150,473 A | 9/1992 | Zulch | |
| 5,151,989 A | 9/1992 | Johnson et al. | |
| 5,202,982 A | 4/1993 | Gramlich et al. | |
| 5,247,658 A * | 9/1993 | Barrett et al. | 707/1 |
| 5,257,366 A | 10/1993 | Adair et al. | |
| 5,295,256 A | 3/1994 | Bapat | |
| 5,307,490 A | 4/1994 | Davidson et al. | |
| 5,388,257 A | 2/1995 | Bauer | |
| 5,390,318 A | 2/1995 | Ramakrishnan et al. | |
| 5,437,029 A | 7/1995 | Sinha | |
| 5,493,682 A * | 2/1996 | Tyra et al. | 717/122 |

(Continued)

FOREIGN PATENT DOCUMENTS

EP 0856803 A2 8/1998

(Continued)

OTHER PUBLICATIONS

Douglas et al. "Elephant: The File System That Never Forgets", In Proceedings of the IEEE Workshop on Hot Topics in Operating Systems (HotOS VII), Mar. 1999).*

(Continued)

*Primary Examiner* — Shew-Fen Lin
(74) *Attorney, Agent, or Firm* — Hickman Palermo Truong Becker Bingham Wong LLP

(57) ABSTRACT

Techniques are provided for managing file versions. In one technique, versions of directories are created responsive to creation of versions of files descendant from the directories. Directory versions are associated with times. Interfile links are maintained so file versions descendant from a directory version reflect the directory version's time. In another technique, a mechanism is provided for tagging file versions that shouldn't be overwritten. Responsive to a first file version's update, it is determined whether that version is tagged. If so, a second version is stored while retaining the first version. Otherwise, the first version is deleted responsive to the second version's storage. In another technique, responsive to a first file version's change, it is determined whether first criteria are satisfied. If so, a second version is created while retaining the first version, and versions of the file's ancestor files that satisfy second criteria are created.

20 Claims, 18 Drawing Sheets

U.S. PATENT DOCUMENTS

| | | | |
|---|---|---|---|
| 5,499,371 A | 3/1996 | Henninger et al. | |
| 5,504,892 A | 4/1996 | Atsatt et al. | |
| 5,513,351 A | 4/1996 | Grantz | |
| 5,544,360 A | 8/1996 | Lewak et al. | |
| 5,561,763 A | 10/1996 | Eto et al. | |
| 5,566,331 A | 10/1996 | Irwin, Jr. et al. | |
| 5,574,915 A | 11/1996 | Lemon et al. | |
| 5,581,755 A | 12/1996 | Koerber et al. | |
| 5,649,158 A | 7/1997 | Lahr et al. | |
| 5,649,200 A * | 7/1997 | Leblang et al. | 717/122 |
| 5,675,802 A * | 10/1997 | Allen et al. | 717/103 |
| 5,682,524 A | 10/1997 | Freund et al. | |
| 5,684,990 A | 11/1997 | Boothby | |
| 5,689,706 A | 11/1997 | Rao et al. | |
| 5,706,510 A * | 1/1998 | Burgoon | 707/203 |
| 5,737,736 A | 4/1998 | Chang | |
| 5,758,153 A | 5/1998 | Atsatt et al. | 707/103 |
| 5,802,518 A | 9/1998 | Karaev et al. | |
| 5,806,078 A * | 9/1998 | Hug et al. | 715/205 |
| 5,819,275 A | 10/1998 | Badger et al. | |
| 5,822,511 A * | 10/1998 | Kashyap et al. | 714/8 |
| 5,825,353 A * | 10/1998 | Will | 345/184 |
| 5,832,526 A | 11/1998 | Schuyler | |
| 5,842,214 A | 11/1998 | Whitney et al. | |
| 5,848,246 A | 12/1998 | Gish | |
| 5,878,415 A * | 3/1999 | Olds | 707/9 |
| 5,878,434 A | 3/1999 | Draper et al. | |
| 5,892,535 A | 4/1999 | Allen et al. | |
| 5,903,897 A | 5/1999 | Carrier, III et al. | |
| 5,905,990 A * | 5/1999 | Inglett | 707/200 |
| 5,915,253 A | 6/1999 | Christiansen | |
| 5,918,225 A | 6/1999 | White et al. | |
| 5,920,867 A | 7/1999 | Van Huben et al. | |
| 5,937,406 A | 8/1999 | Balabine et al. | |
| 5,978,791 A | 11/1999 | Farber et al. | |
| 5,983,277 A * | 11/1999 | Heile et al. | 709/232 |
| 5,991,771 A | 11/1999 | Falls et al. | |
| 6,023,706 A | 2/2000 | Schmuck et al. | 707/200 |
| 6,029,160 A | 2/2000 | Cabrera et al. | |
| 6,029,166 A | 2/2000 | Mutalik et al. | |
| 6,029,175 A | 2/2000 | Chow et al. | 707/104 |
| 6,052,122 A * | 4/2000 | Sutcliffe et al. | 345/751 |
| 6,055,527 A | 4/2000 | Badger et al. | |
| 6,088,694 A | 7/2000 | Burns et al. | |
| 6,092,086 A | 7/2000 | Martin et al. | |
| 6,115,741 A | 9/2000 | Domenikos et al. | |
| 6,119,118 A | 9/2000 | Kain, III et al. | 707/10 |
| 6,122,645 A * | 9/2000 | Bohannon et al. | 707/203 |
| 6,185,574 B1 | 2/2001 | Howard et al. | 707/200 |
| 6,212,512 B1 | 4/2001 | Barney et al. | |
| 6,212,557 B1 * | 4/2001 | Oran | 709/221 |
| 6,216,140 B1 | 4/2001 | Kramer | |
| 6,230,310 B1 | 5/2001 | Arrouye et al. | |
| 6,233,729 B1 | 5/2001 | Campara et al. | 717/4 |
| 6,247,024 B1 | 6/2001 | Kincaid | 707/204 |
| 6,269,431 B1 * | 7/2001 | Dunham | 711/162 |
| 6,279,007 B1 | 8/2001 | Uppala | |
| 6,301,592 B1 * | 10/2001 | Aoyama et al. | 715/229 |
| 6,301,605 B1 | 10/2001 | Napolitano et al. | |
| 6,314,408 B1 * | 11/2001 | Salas et al. | 705/54 |
| 6,321,219 B1 | 11/2001 | Gainer et al. | |
| 6,330,573 B1 * | 12/2001 | Salisbury et al. | 715/234 |
| 6,332,200 B1 * | 12/2001 | Meth et al. | 714/16 |
| 6,339,382 B1 | 1/2002 | Arbinger et al. | |
| 6,349,295 B1 * | 2/2002 | Tedesco et al. | 707/3 |
| 6,366,921 B1 | 4/2002 | Hansen et al. | |
| 6,366,988 B1 * | 4/2002 | Skiba et al. | 711/165 |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,397,231 B1 | 5/2002 | Salisbury et al. | |
| 6,421,692 B1 | 7/2002 | Milne et al. | |
| 6,427,123 B1 | 7/2002 | Sedlar | |
| 6,438,550 B1 | 8/2002 | Doyle et al. | |
| 6,442,548 B1 | 8/2002 | Balabine et al. | |
| 6,446,091 B1 * | 9/2002 | Noren et al. | 707/202 |
| 6,453,325 B1 | 9/2002 | Cabrera et al. | |
| 6,457,007 B1 | 9/2002 | Kikuchi et al. | |
| 6,487,469 B1 | 11/2002 | Formenti | |
| 6,487,552 B1 | 11/2002 | Lei et al. | |
| 6,493,742 B1 | 12/2002 | Holland et al. | |
| 6,505,212 B2 * | 1/2003 | Nakano et al. | 707/200 |
| 6,532,488 B1 | 3/2003 | Ciarlante et al. | |
| 6,535,970 B1 | 3/2003 | Bills et al. | |
| 6,587,873 B1 | 7/2003 | Nobakht et al. | |
| 6,594,675 B1 | 7/2003 | Schneider | |
| 6,604,236 B1 * | 8/2003 | Draper et al. | 717/170 |
| 6,697,805 B1 | 2/2004 | Choquier et al. | |
| 6,970,975 B2 | 11/2005 | Frank | |
| 6,973,455 B1 | 12/2005 | Vahalia et al. | |
| 7,031,956 B1 | 4/2006 | Lee et al. | |
| 7,047,253 B1 | 5/2006 | Murthy et al. | |
| 7,051,039 B1 | 5/2006 | Murthy et al. | |
| 7,171,407 B2 | 1/2007 | Barton et al. | |
| 7,359,934 B1 | 4/2008 | Ricart et al. | |
| 2002/0073056 A1 | 6/2002 | Broster et al. | |
| 2002/0103829 A1 | 8/2002 | Manning et al. | |
| 2002/0138617 A1 | 9/2002 | Christfort et al. | |
| 2002/0188613 A1 | 12/2002 | Chakraborty et al. | |
| 2003/0033285 A1 | 2/2003 | Jalali et al. | |
| 2003/0131051 A1 | 7/2003 | Lection et al. | |
| 2004/0148278 A1 | 7/2004 | Milo et al. | |
| 2004/0205551 A1 | 10/2004 | Santos | |
| 2004/0267760 A1 | 12/2004 | Brundage et al. | |
| 2005/0289125 A1 | 12/2005 | Liu et al. | |
| 2006/0074925 A1 | 4/2006 | Bixby et al. | |
| 2007/0118561 A1 | 5/2007 | Idicula et al. | |

FOREIGN PATENT DOCUMENTS

| | | |
|---|---|---|
| EP | 0 903 674 A1 | 3/1999 |
| EP | 1 876 542 A2 | 1/2008 |
| WO | WO 97/46956 | 12/1997 |
| WO | WO 98/00795 | 1/1998 |
| WO | WO 98/27489 | 6/1998 |
| WO | WO 99/40509 | 8/1999 |
| WO | WO 00/14632 | 3/2000 |

OTHER PUBLICATIONS

Herman Chung-Hwa Rao, et al., "An Overview of the Internet File System," 1997, IEEE, XP-002204711, pp. 474-477.

Oracle, "Oracle iFS (Internet File System)," Mar. 1999, XP-002204710, 3 pages.

Ricardo, Catherine, "Database Systems: Principles, Design, & Implementation," 1990, MacMillian Publishing Co., pp. 357-361, 379-380.

Santry et al., "Elephant: The File System that Never Forgets" no date, *Hewlett Packard Laboratories*, Palo Alto, California.

Communication received Mar. 3, 2008 received in Application No. 07013457-2-1225 (5 pages).

Santry, D et al., "Elephant: The File System that Never Forgets" (6 pages).

Oracle® iFs (Internet File System) "Technical Data Sheet" Mar. 1999 (3 pages).

Canadian Office Action, Application No. 2,379,930 dated May 12, 2008 (4 pages).

"Power Schemas with Stylus Studio," Whitepaper published by Sonic Software Corporation, Jan. 2004.

U.S. Appl. No. 09/728,909, filed Dec. 1, 2000.

U.S. Appl. No. 09/728,909, filed Dec. 1, 2000, Office Action, Mar. 9, 2005.

Canadian Office Action received in Application No. 2,646,776 dated Dec. 23, 2009 (4 pages).

Current Claims of Application No. 2,646,776, Dec. 2009 (3 pages).

* cited by examiner

HIERARCHICAL INDEX 510

| Row ID | File ID | Dir Entry list |
|---|---|---|
| Y1 | X1 | {(Windows, Y2, X2)<br>(Unix, Y4, X6)<br>(VMS, Y5, X9)} |
| Y2 | X2 | {(Word, Y3, X3)<br>(Access, null, X5)} |
| Y3 | X3 | {(Example.doc, null, X4)} |
| Y4 | X6 | {(App1, null, X7)<br>(App2, null, X8)} |
| Y5 | X9 | {(App3, null, X10)<br>(App4, Y6, X11)} |
| Y6 | X11 | {(Example.doc, null, X12)} |

508 → Y1
512 → Y2
514 → Y3
516 → Y4
518 → (App1, null, X7)

Fig. 5

FILES TABLE 710

| Row ID | File ID | Name | Body | Modification Date... |
|---|---|---|---|---|
| R1 | X1 | / | (NULL) | |
| R2 | X2 | Windows | (NULL) | |
| R3 | X3 | Word | (NULL) | |
| R4 | X4 | Example.doc | BLOB | |
| R5 | X5 | Access | (NULL) | |
| R6 | X6 | Unix | (NULL) | |
| R7 | X7 | App1 | (NULL) | |
| R8 | X8 | App2 | (NULL) | |
| R9 | X9 | VMS | (NULL) | |
| R10 | X10 | App3 | (NULL) | |
| R11 | X11 | App4 | (NULL) | |
| R12 | X12 | Example.doc | BLOB | |

Fig. 7

FILES TABLE 710

| Row ID | File ID | Name | Body | Modification Date... |
|---|---|---|---|---|
| R1 | X1 | / | (NULL) | |
| R2 | X2 | Windows | (NULL) | |
| R3 | X3 | Word | (NULL) | |
| R4 | X4 | Example.doc | BLOB | |
| R5 | X5 | Access | (NULL) | |
| R6 | X6 | Unix | (NULL) | |
| R7 | X7 | App1 | (NULL) | |
| R8 | X8 | App2 | (NULL) | |
| R9 | X9 | VMS | (NULL) | |
| R10 | X10 | App3 | (NULL) | |
| R11 | X11 | App4 | (NULL) | |
| R12 | X12 | Example.doc | BLOB | |
| R13 | X13 | Documents | (NULL) | |

Fig. 11

FILES TABLE 1702

| ROWID | FILEID | NAME | CLASS | CREATE DATE | MODIFY DATE | DERIVED ROWID |
|---|---|---|---|---|---|---|
| X1 | F1 | FILE1 | FILE | | *** | NULL |
| X2 | F2 | FILE2 | DOCUMENT | | *** | Y1 |
| X3 | F3 | FILE3 | E-MAIL | | *** | Y2 |
| X4 | F4 | FILE4 | TEXT | | *** | Y3 |
| X5 | F5 | FILE5 | FOLDER | | *** | Z1 |

DOCUMENT TABLE 1704

| ROWID | FILEID | SIZE | DERIVED ROWID |
|---|---|---|---|
| Y1 | F2 | 100 | NULL |
| Y2 | F3 | 78 | Q1 |
| Y3 | F4 | 223 | R1 |

TEXT TABLE 1708

| ROWID | FILEID | CR_FLAG |
|---|---|---|
| R1 | F4 | TRUE |

FOLDER TABLE 1708

| ROWID | FILEID | MAX_CHILDREN |
|---|---|---|
| Z1 | F5 | 256 |

E-MAIL TABLE 1706

| ROWID | FILEID | READ_FLAG | PRIORITY | SENDER |
|---|---|---|---|---|
| Q1 | F3 | TRUE | HIGH | JOE |

FIG. 17

VERSIONING IN INTERNET FILE SYSTEM

PRIORITY CLAIM AND CROSS-REFERENCE TO RELATED APPLICATIONS

This application is related to and claims domestic priority under 35 U.S.C. §119(e) from prior U.S. Provisional Patent Application Ser. No. 60/147,538 filed on Aug. 5, 1999 entitled "Internet File System", by Eric Sedlar, the entire disclosure of which is hereby incorporated by reference as if fully set forth herein.

This application is related to U.S. patent application Ser. No. 09/251,757 filed on Feb. 18, 1999, entitled "Hierarchical Indexing for Accessing Hierarchically Organized Information in a Relational System", by Eric Sedlar, the entire disclosure of which is hereby incorporated by reference as if fully set forth herein.

This application is related to U.S. patent application Ser. No. 09/571,508, filed May 15, 2000, entitled "Multi-model Access to Data", by Eric Sedlar, the entire disclosure of which is hereby incorporated by reference as if fully set forth herein.

This application is related to U.S. patent application Ser. No. 09/571,496, filed May 15, 2000, entitled "File System that Supports Transactions", by Eric Sedlar, the entire disclosure of which is hereby incorporated by reference as if fully set forth herein.

This application is related to U.S. patent application Ser. No. 09/571,060, filed May 15, 2000, entitled "Stored Query Directories", by Eric Sedlar, the entire disclosure of which is hereby incorporated by reference as if fully set forth herein.

This application is related to U.S. patent application Ser. No. 09/571,036, filed May 15, 2000, entitled "Event Notification System Tied to a File System", by Eric Sedlar, the entire disclosure of which is hereby incorporated by reference as if fully set forth herein.

This application is related to U.S. patent application Ser. No. 09/571,492, filed May 15, 2000, entitled "Object File System with Typed Files", by Eric Sedlar, the entire disclosure of which is hereby incorporated by reference as if fully set forth herein.

This application is related to U.S. patent application Ser. No. 09/571,568, filed May 15, 2000, entitled "On-the-fly Format Conversion", by Eric Sedlar, the entire disclosure of which is hereby incorporated by reference as if fully set forth herein.

FIELD OF THE INVENTION

The present invention relates generally to electronic file systems, and in particular to a system which implements an operating system file system using a database system.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional operating systems, for example, provide file systems that use hierarchy-based organization principles. Specifically, a typical operating system file system ("OS file system") has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 illustrates a typical mechanism by which a software application that creates and uses a file (such as a word processor) stores the file in a hierarchical file system. Referring to FIG. 1, an operating system 104 exposes to an application 102 an application programming interface (API). The API thus exposed allows the application 102 to call routines provided by the operating system. The portion of the OS API associated with routines that implement the OS file system is referred to herein as the OS file API. The application 102 calls file system routines through the OS file API to retrieve and store data on disk 108. The operating system 104, in turn, makes calls to a device driver 106 that controls access to the disk 108 to cause the files to be retrieved from and stored on disk 106.

The OS file system routines implement the hierarchical organization of the file system. For example, the OS file system routines maintain information about the hierarchical relationship between files, and provide application 102 access to the files based on their location within the hierarchy.

In contrast to hierarchical approaches to organizing electronic information, a relational database stores information in tables comprised of rows and columns. Each row is identified by a unique RowID. Each column represents an attribute of a record, and each row represents a particular record. Data is retrieved from the database by submitting queries to a database management system (DBMS) that manages the database.

FIG. 2 illustrates a typical mechanism by which a database application accesses information in a database. Referring to FIG. 2, database application 202 interacts with a database server 204 through an API provided by the database server 204 (a "database API"). The API thus exposed allows the database application 202 to access data using queries constructed in the database language supported by the database server 204. One such language that is supported by many database servers is the Structured Query Language (SQL). To the database application 202, database server 204 makes it appear that all data is stored in rows of tables. However, transparent to database application 202, the database server 204 actually interacts with the operating system 104 to store the data as files in the OS file system. The operating system 104, in turn, makes calls to device driver 106 to cause the files to be retrieved from and stored on disk 108.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system.

However, the process of formulating and submitting queries to a database server is less intuitive than merely traversing a hierarchy of directories, and is beyond the technical comfort level of many computer users.

Currently, application developers are forced to choose whether they want data created by their applications to be accessible through the hierarchical file system provided by operating systems, or through the more complex query interface provided by database systems. In general, if applications do not demand the complex search capability of a database system, the applications are designed to store their data using the more prevalent and simpler hierarchical file system provided by operating systems. This simplifies both application design and application use, but also limits the flexibility and power with which the data can be accessed.

On the other hand, if complex search capability is required, the applications are designed to access their data using query mechanism provided by database systems. While this increases the flexibility and power with which the data may be accessed, it also increases the complexity of the application, both from the perspective of the designer and the perspective of the user. It further requires the presence of a database system, which imposes an additional expense to the application user.

Based on the foregoing, it is clearly desirable to allow applications to access data using the relatively simple OS file APIs. It is further desirable to allow access to that same data using the more powerful database API.

SUMMARY OF THE INVENTION

Techniques are provided for managing versions of files in a file system. According to one embodiment, new versions of directories are created in response to creation of new versions of files that descend from the directories, where the different versions of a versioned directory are associated with different points in time. Links are maintained between the files in the file system such that the versions of the files that descend from a particular version of a versioned directory reflect the point in time associated with the versioned directory.

According to another embodiment, a mechanism is provided for tagging versions of files that are not to be overwritten. In response to an update to a first version of a file, the following steps are performed: determining whether the first version of the file is tagged; if the first version of the file is tagged, then storing the second version of the file while retaining the first version of the file; and if the first version of the file is not tagged, then deleting the first version of the file in response to storing the second version of the file.

According to another embodiment, in response to a change made to a first version of a file, it is determined whether a first set of criteria is satisfied. If the first set of criteria is satisfied, then a second version of the file is created while retaining the first version of the file. A new version of each ancestor file above the file in a file hierarchy is created if the ancestor file satisfies a second set of criteria.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram that illustrates a hierarchical index;

FIG. 7 is a block diagram of a files table that can be used to store files within a relational database according to an embodiment of the invention;

FIG. 11 is a block diagram of a files table that includes a row for a stored query directory;

FIG. 17 is a block diagram of relational tables that are used in a database-implemented file system that implements the file class hierarchy of FIG. 16, according to one embodiment of the invention.

DETAILED DESCRIPTION OF THE PREFERRED EMBODIMENT

A method and system are provided that allow the same set of data to be accessed through a variety of interfaces, including a database API and an OS file system API. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Architectural Overview

Figure 1:
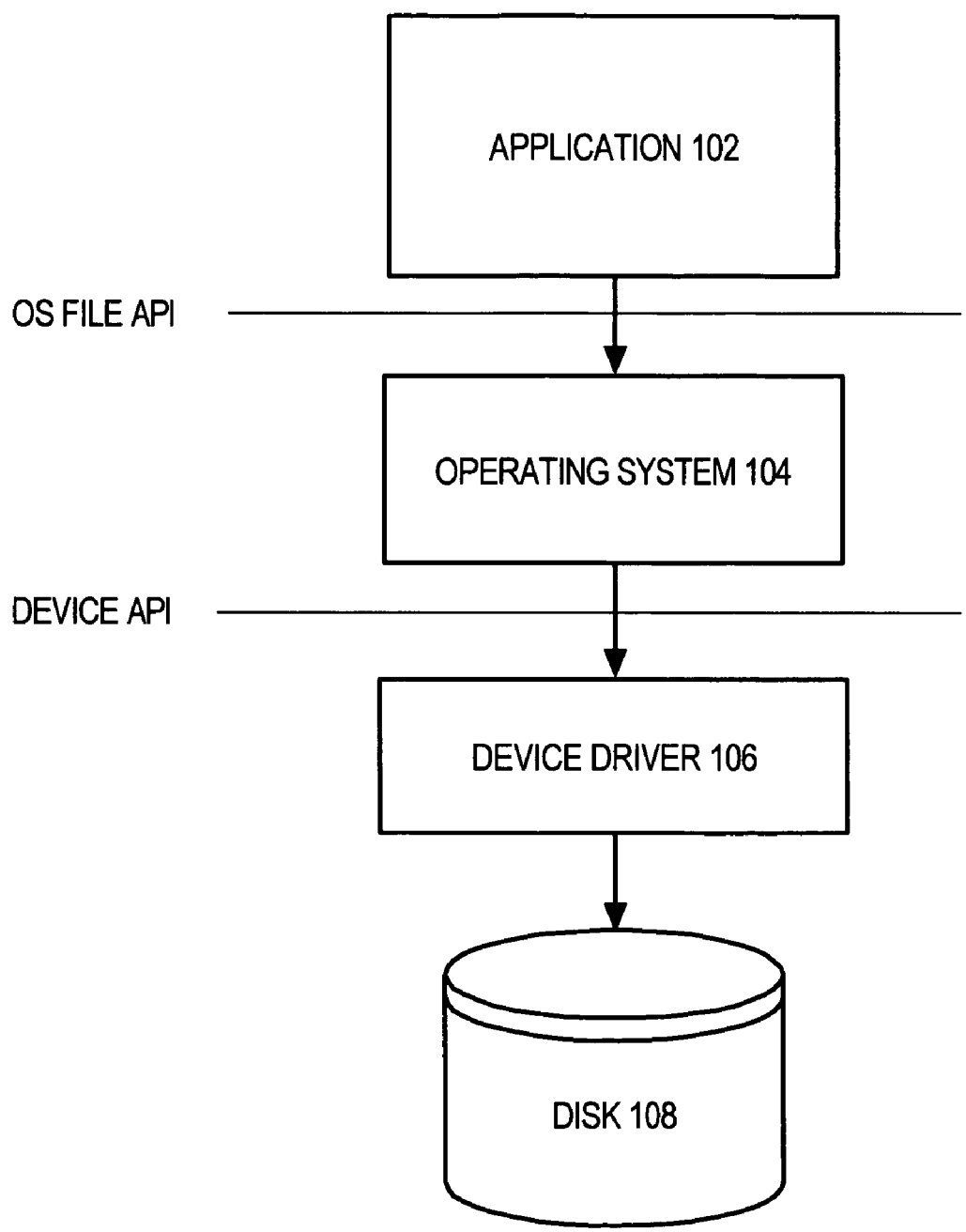
FIG. 1 is a block diagram that illustrates how conventional applications store data through the file system provided by an operating system.
Figure 2:
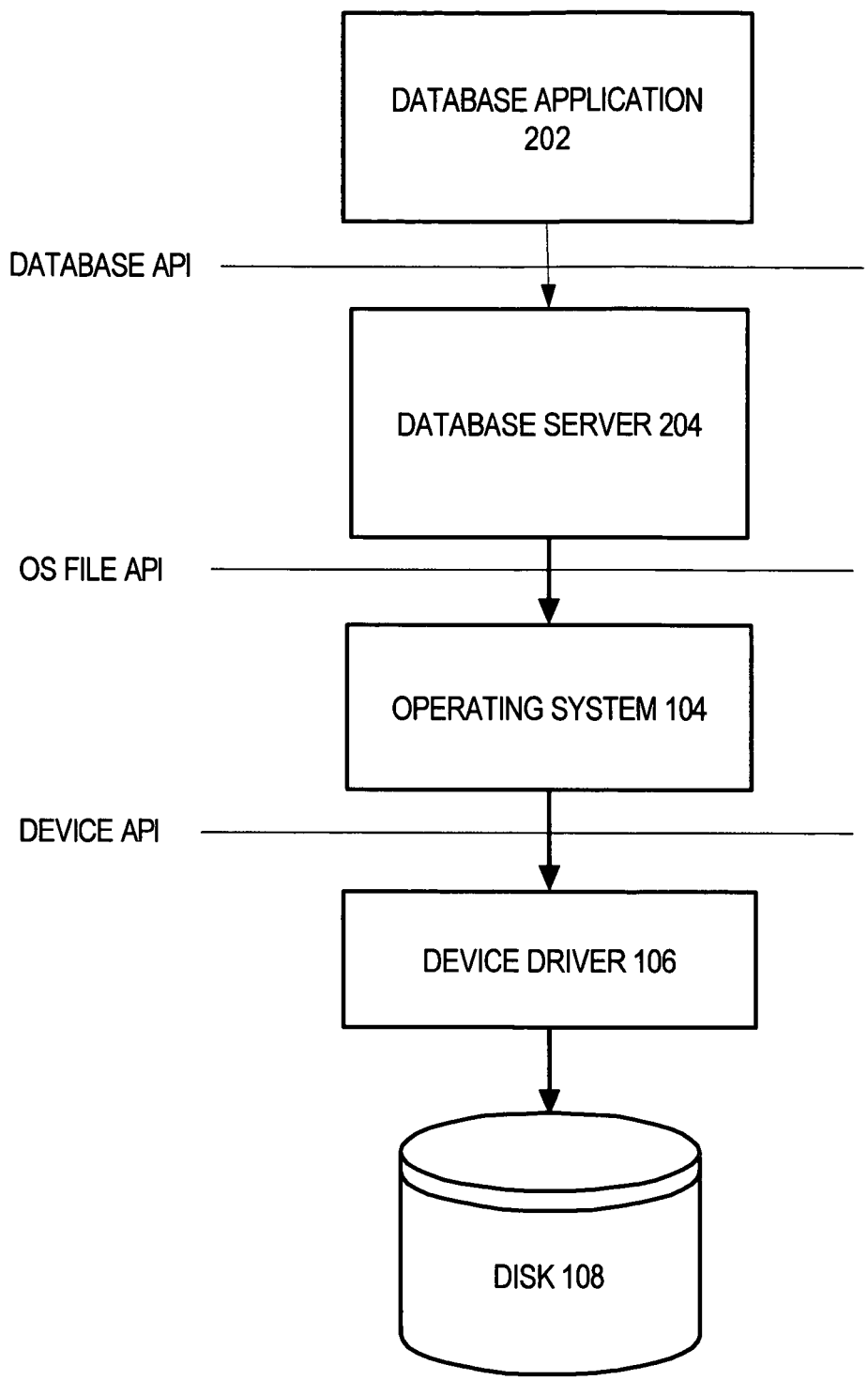
FIG. 2 is a block diagram that illustrates how conventional database applications store data through the database API provided by a database system.
Figure 3:
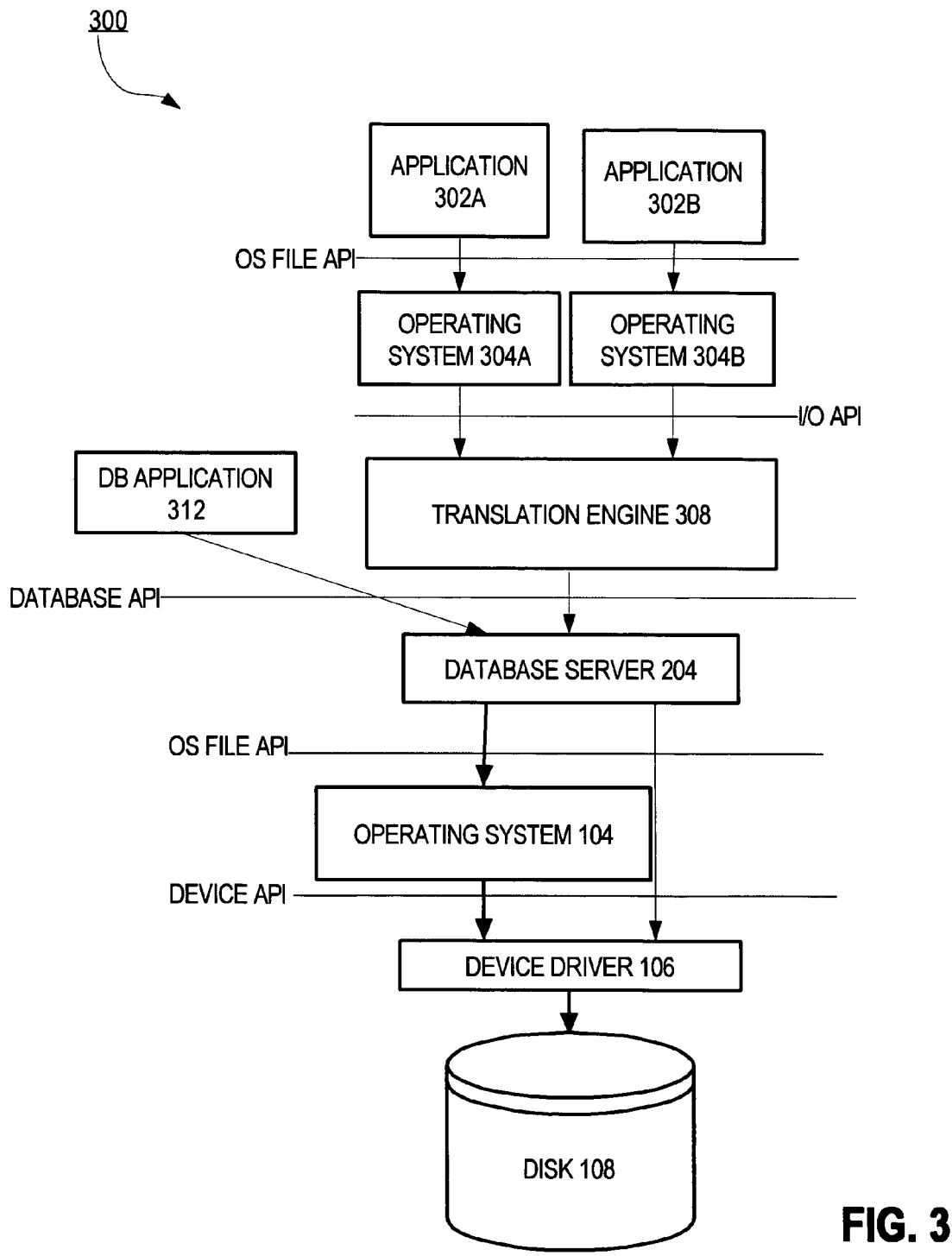
FIG. 3 is a block diagram that illustrates a system in which the same set of data may be accessed though a variety of interfaces, including a database API and an OS file system API.

FIG. 3 is a block diagram that illustrates the architecture of a system 300 implemented according to an embodiment of the invention. Similar to the system illustrated in FIG. 2, system 300 includes a database server 204 that provides a database API through which a database application 312 can access data managed by database server 204. From the perspective of all entities that access data managed by database server 204 through the database API, the data managed by database server 204 is stored in relational tables that can be queried using the database language supported by database server 204 (e.g. SQL). Transparent to those entities, database server 204 stores the data to disk 108. According to one embodiment, database server 204 implements disk management logic that allows it to store the data directly to disk and thus avoid the overhead associated with the OS file system of operating system 104. Thus, database server 204 may cause the data to be stored to disk either by (1) by making calls to the OS file system provided by operating system 104, or (2) storing the data directly to disk, thus circumventing operating system 104.

Unlike the system of FIG. 2, system 300 provides a translation engine 308 that translates I/O commands received from operating systems 304a and 304b into database commands that the translation engine 308 issues to database server 204. When the I/O commands call for the storage of data, translation engine 308 issues database commands to database server 204 to cause the data to be stored in relational tables managed by database server 204. When the I/O commands call for the retrieval of data, translation engine 308 issues database commands to database server 204 to retrieve data from relational tables managed by database server. Translation engine 308 then provides the data thus retrieved to the operating system that issued the I/O commands.

To operating systems 304a and 304b, the fact that data passed to translation engine 308 is ultimately stored in a relational database managed by database server 204 is transparent. Because it is transparent to operating systems 304a and 304b, it is also transparent to applications 302a and 302b that are running on platforms that include those operating systems.

For example, assume that the user of application 302a selects a "save file" option provided by the application 302a. The application 302a makes a call through the OS File API to cause operating system 304a to save the file. The operating system 304a issues an I/O command to translation engine 308 to store the file. Translation engine 308 responds by issuing one or more database commands to database server 204 to cause the database server 204 to store the data contained in the file into relational tables maintained by the database server 204. Database server 204 may either store the data directly to disk or make calls to the operating system 104 to cause the data to be stored in the OS file system provided by operating system 104. If database server 204 calls operating system 104, operating system 104 responds by causing the data to be stored on disk 108 by sending commands to device driver 106.

As another example, assume that the user of application 302a selects a "load file" option provided by the application 302a. The application 302a makes a call through the OS File API to cause operating system 304a to load a file. The operating system 304a issues an I/O command to translation engine 308 to load the file. Translation engine 308 responds by issuing one or more database commands to database server 204 to cause the database server 204 to retrieve from relational tables maintained by the database server 204 the data that comprises the file to be retrieved. During the retrieval of the data, database server 204 may either retrieve the data directory or make calls to the operating system 104 to cause the data to be retrieved from OS files on disk 108. Once the data is retrieved, the desired file is "constructed" from the retrieved data. Specifically, the retrieved data is placed in a format expected by the application 302a that requested the file. The file thus constructed is passed through the translation engine 308 and operating system 304a up to application 302a.

System 300 incorporates numerous novel features. In the following sections, these features shall be described in greater detail. It should be understood, however, that the specific embodiments are used to describe the features, and that the invention is not limited to those specific embodiments.

OS File System Access to Relationally Stored Data

According to one aspect of the invention, system 300 allows applications to access data stored in a database through the conventional OS file APIs. That means that conventional applications that have been designed to load files by making calls to the standard OS file API provided by operating systems are able to load files that are constructed on-the-fly from data stored in relational tables. Further, the fact that the data originates from relational tables is entirely transparent to the applications.

For example, assume that database application 312 issues a database command to insert a row of data into a table in the database maintained by database server 204. Once the row has been inserted, application 302a, which is only designed to access data using the relatively simple OS file API provided by operating system 304a, issues a "file open" command to operating system 304a. In response, operating system 304a issues an I/O command to translation engine 308, which responds by issuing one or more database commands to database server 204. Database server 204 executes the database command (typically in the form of a database query), thereby causing database server 204 to retrieve the row inserted by database application 312. A file of the file type expected by application 302a is constructed from the data contained in the row, and the file thus constructed is passed back up to application 302A through translation engine 308 and operating system 304a.

System 300 not only allows relationally stored data to be loaded by applications that only support conventional OS file system access, but system 300 also allows information stored by applications that only support conventional OS file system access to be accessed by database applications using conventional querying techniques. For example, assume that application 302a makes an OS call to save a file that it has created. That "file save" command is passed down through operating system 304a and translation engine 308 to database server 204. Database server 204 receives the "file save" command in the form of a database command, issued by translation engine 308, to store the data contained in that file into one or more rows of one or more tables contained in the database managed by database server 204. Once the data is stored within the database in that manner, database application 312 may issue database queries to database server 204 to retrieve the data from the database.

Emulating OS File System Organization in a Database

As explained above, calls made to the file system routines of operating systems 304a and 304b are ultimately translated to database commands issued by translation engine 308 to database server 204. According to one embodiment of the invention, the process of performing these translations is simplified by emulating within database server 204 the characteristics of the file systems implemented by operating systems 304a and 304b.

With respect to the organizational model, most operating systems implement file systems that organize files in a file hierarchy. Thus, the OS file system calls made by applications 302a and 302b will typically identify a file in terms of its location within the OS file hierarchy. To simplify the translation of such calls to corresponding database calls, a mechanism is provided for emulating a hierarchical file system within a relational database system. One such mechanism is described in detail in U.S. patent application Ser. No. 09/251,757, entitled "HIERARCHICAL INDEXING FOR ACCESSING HIERARCHICALLY ORGANIZED INFORMATION IN A RELATIONAL SYSTEM" filed by Eric Sedlar on Feb. 18, 1999, the entire contents of which are incorporated herein by reference.

Specifically, the "HIERARCHICAL INDEXING" application describes techniques for creating, maintaining, and using a hierarchical index to efficiently access information in a relational system based on a pathnames, thus emulating a hierarchically organized system.

Each item that has any children in the emulated hierarchical system has an index entry in the index. The index entries in the index are linked together in a way that reflects the hierarchical relationship between the items associated with the index entries. Specifically, if a parent-child relationship exists between the items associated with two index entries, then the index entry associated with the parent item has a direct link to the index entry associated with the child item.

Consequently, pathname resolution is performed by following direct links between the index entries associated with the items in a pathname, according to the sequence of the filenames within the pathname. By using an index whose index entries are linked in this manner, the process of accessing the items based on their pathnames is significantly accelerated, and the number of disk accesses performed during that process is significantly reduced.

Hierarchical Index

Hierarchical indexes consistent with the invention support the pathname-based access method of a hierarchical system, moving from parent items to their children, as specified by the pathname. According to one embodiment, a hierarchical index consistent with the principles of the invention employs index entries that include the following three fields: RowID, File ID, and Dir_entry_list (stored as an array).

Figure 6:
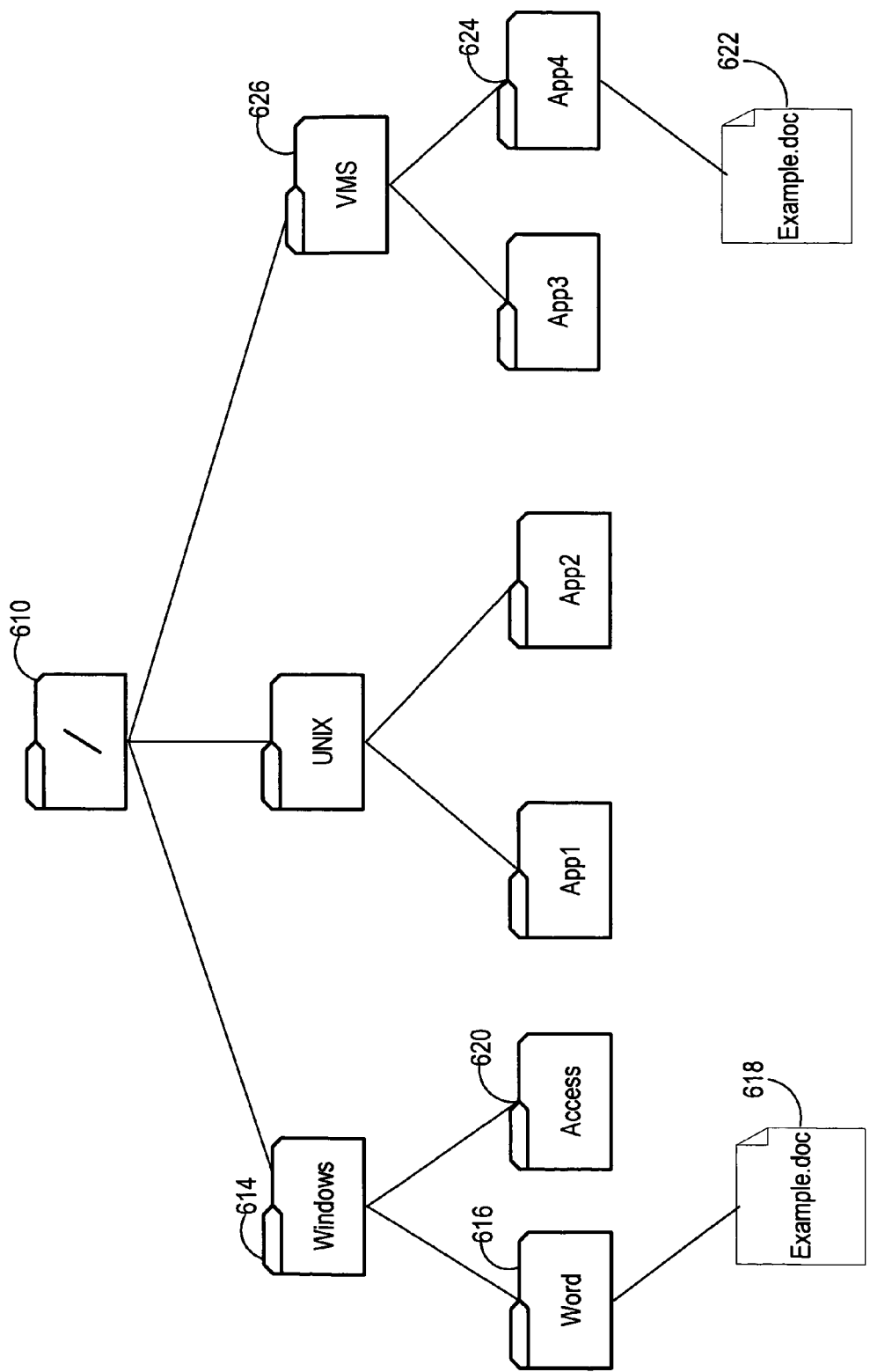
FIG. 6 is a block diagram of a file hierarchy that can be emulated by a hierarchical index.

FIG. 5 shows a hierarchical index 510 which may be used to emulate a hierarchical storage system in a database. FIG. 6 shows the specific file hierarchy that hierarchical index 510 is emulating. FIG. 7 shows a files table 710, used to store the files illustrated in FIG. 6 within a relational database.

Hierarchical index 510 is a table. The RowID column contains system generated Ids, specifying a disk address that enables database server 204 to locate the row on the disk. Depending on the relational database system, RowID may be an implicitly defined field that the DBMS uses for locating data stored on the disk drive. The FileID field of an index entry stores the FileID of the file that is associated with the index entry.

According to one embodiment of the invention, hierarchical index 510 only stores index entries for items that have children. In the context of an emulated hierarchical file system, therefore, the items that have index entries in the hierarchical index 510 are only those directories that are parents to other directories and/or that are currently storing documents. Those items that do not have children (e.g. Example.doc, Access, App1, App2, App3 of FIG. 6) are preferably not included. The Dir_entry_list field of the index entry for a given file stores, in an array, an "array entry" for each of the child files of the given file.

For example, index entry 512 is for the Windows directory 614. The Word directory 616 and the Access directory 620 are children of the Windows directory 614. Hence, the Dir_entry_list field of index entry 512 for the Windows directory 614 includes an array entry for the Word directory 616 and an array entry for the Access directory 620.

According to one embodiment, the specific information that the Dir_entry_list field stores for each child includes the filename of the child and the FileID of the child. For children that have their own entries in the hierarchical index 510, the Dir_entry_list field also stores the RowID of the child's index entry. For example, the Word directory 616 has its own entry in hierarchical index 510 (entry 514). Hence, the Dir_entry_list field of index entry 512 includes the name of directory 616 ("Word"), the RowID of the index entry for directory 616 in hierarchical index 510 ("Y3"), and the FileID of directory 616 ("X3"). As shall be described in greater detail, the information contained in the Dir_entry_list field makes accessing information based on pathnames much faster and easier.

Several key principles of the hierarchical index are as follows:

The Dir_entry_list information in the index entry for a given directory is kept together in as few disk blocks as possible, since the most frequently used filesystem operations (pathname resolution, directory listing) will need to look at many of the entries in a particular directory whenever that directory is referenced. In other words, directory entries should have a high locality of reference because when a particular directory entry is referenced, it is likely that other entries in the same directory will also be referenced.

The information stored in the index entries of the hierarchical index must be kept to a minimum, so as to fit the maximum number of entries in a particular disk block. Grouping directory entries together in an array means that there is no need to replicate a key identifying the directory they are in; all of the entries in a directory share the same key.

The time needed to resolve a pathname should be proportional to the number of directories in the path, not the total number of files in the filesystem. This allows the user to keep frequently-accessed files toward the top of the filesystem tree, where access time is lower.

These elements are all present in typical file system directory structures, such as the UNIX system of inodes and directories. The use of a hierarchical index, as described herein, reconciles those goals with the structures that a relational database understands and can query, to allow the database server to do ad-hoc searches of files in a manner other than that used in pathname resolution. To do this, the database concept of an index must be used: a duplicate of parts of the underlying information (in this case, the file data) arranged in a separate data structure in a different manner designed to optimize access via a particular method (in this case, resolution of a pathname in a hierarchical tree).

Using the Hierarchical Index

Figure 8:
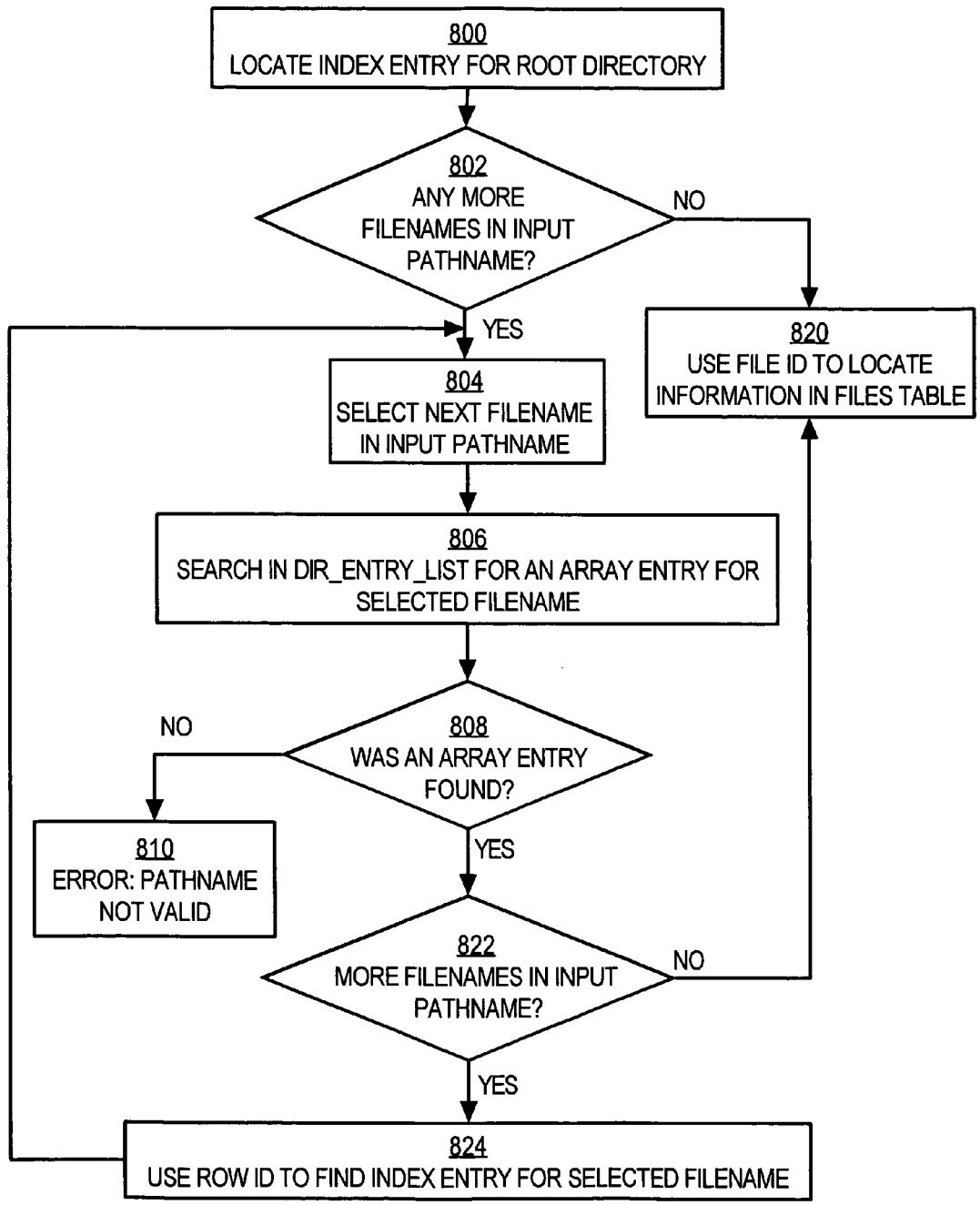
FIG. 8 is a flowchart illustrating the steps for resolving a pathname using a hierarchical index.

How hierarchical index 510 may be used to access a file based on the pathname of the file shall now be described with reference to the flowchart in FIG. 8. It shall be assumed for the purpose of explanation that document 618 is to be accessed through its pathname. The pathname for this file is /Windows/Word/Example.doc, which shall be referred to hereafter as the "input pathname". Given this pathname, the pathname resolution process starts by locating within hierarchical index 510 the index entry for the first name in the input pathname. In the case of a file system, the first name in a pathname is the root directory. Therefore, the pathname resolution process for locating a file within an emulated file system begins by locating the index entry 508 of the root directory 610 (step 800). Because all pathname resolution operations begin by accessing the root directory's index entry 508, data that indicates the location of the index entry for the root directory 610 (index entry 508) may be maintained at a convenient location outside of the hierarchical index 510 in order to quickly locate the index entry 508 of the root directory at the start of every search.

Once the index entry 508 for the root directory 610 has been located, the DBMS determines whether there are any more filenames in the input pathname (step 802). If there are no more filenames in the input pathname, then control proceeds to step 820 and the FileID stored in index entry 508 is used to look up the root directory entry in the files table 710.

In the present example, the filename "Windows" follows the root directory symbol "/" in the input pathname. Therefore, control proceeds to step 804. At step 804, the next filename (e.g. "Windows") is selected from the input pathname. At step 806, the DBMS looks in the Dir_entry_list column of the index entry 508 to locate an array entry pertaining to the selected filename.

In the present example, the filename that follows the root directory in the input pathname is "Windows". Therefore, step 806 involves searching the Dir_entry_list of index entry 508 for an array entry for the filename "Windows". If the Dir_entry_list does not contain an array entry for the selected filename, then control would proceed from step 808 to step 810, where an error is generated to indicate that the input pathname is not valid. In the present example, the Dir_entry_list of index entry 508 does include an array entry for "Windows". Therefore, control passes from step 808 to step 822.

The information in the Dir_entry_list of index entry 508 indicates that one of the children of the root directory 610 is indeed a file named "Windows". Further, the Dir_entry_list array entry contains the following information about this child: it has an index entry located at RowID Y2, and its FileID is X2.

At step 822, it is determined whether there are any more filenames in the input pathname. If there are no more filenames, then control passes from step 822 to step 820. In the present example, "Windows" is not the last filename, so control passes instead to step 824.

Because "Windows" is not the last filename in the input path, the FileID information contained in the Dir_entry_list is not used during this path resolution operation. Rather, because Windows directory 614 is just part of the specified path and not the target, files table 710 is not consulted at this point. Instead, at step 824 the RowID (Y2) for "Windows", which is found in the Dir_entry_list of index entry 508, is used to locate the index entry for the Windows directory 614 (index entry 512).

Consulting the Dir_entry_list of index entry 512, the system searches for the next filename in the input pathname (steps 804 and 806). In the present example, the filename "Word" follows the filename "Windows" in the input pathname. Therefore, the system searches the Dir_entry_list of index entry 512 for an array entry for "Word". Such an entry exists in the Dir_entry_list of index entry 512, indicating that "Windows" actually does have a child named "Word" (step 808). At step 822, it is determined that there are more filenames in the input path, so control proceeds to step 824.

Upon finding the array entry for "Word", the system reads the information in the array entry to determine that an index entry for the Word directory 616 can be found in hierarchical index 510 at RowID Y3, and that specific information pertaining to Word directory 616 can be found in files table 710 at row X3. Since Word directory 616 is just part of the specified path and not the target, files table 710 is not consulted. Instead, the system uses the RowID (Y3) to locate the index entry 514 for Word directory 616 (step 824).

At RowID Y3 of hierarchical index 510, the system finds index entry 514. At step 804, the next filename "Example.doc" is selected from the input pathname. At step 806, the Dir_entry_list of index entry 514 is searched to find (step 808) that there is an array entry for "Example.doc", indicating that "Example.doc" is a child of Word directory 616. The system also finds that Example.doc has no indexing information in hierarchical index 510, and that specific information pertaining to Example.doc can be found in files table 710 using the FileID X4. Since Example.doc is the target file to be accessed (i.e. the last filename in the input path), control passes to step 820 where the system uses the FileID X4 to access the appropriate row in the files table 710, and to extract the file body (the BLOB) stored in the body column of that row. Thus, the Example.doc file is accessed.

In accessing this file, only hierarchical index 510 was used. No table scans were necessary. With typical sizes of blocks and typical filename lengths, at least 600 directory entries will fit in a disk block, and a typical directory has less than 600 entries. This means that the list of directory entries in a given directory will typically fit in a single block. In other words, each index entry of hierarchical index 510, including the entire Dir_entry_list array of the index entry, will typically fit in a single block, and therefore can be read in a single I/O operation.

In moving from index entry to index entry in the hierarchical index 510, it is possible that some disk accesses will need to be performed if the various index entries in the index reside in different disk blocks. If each index entry entirely fits in a single block, then number of disk accesses, however, will at most be the number of directories in the path. Even if the size of an average index entry does not fit in a single disk block, the number of disk accesses per directory will be a constant term, and will not increase with the total number of files in the file system.

The foregoing description of techniques for emulating the hierarchical characteristic possessed by some file systems is merely exemplary. Other techniques may be used to emulate the hierarchical characteristics of some file systems and protocols. Further, some protocols may not even possess a hierarchical characteristic. Thus, the present invention is not limited to any particular technique for emulating the hierarchical characteristic of some protocols. Further, the present invention is not limited to protocols that are hierarchical in nature.

Emulating Other Os File System Characteristics in a Database

Beyond the hierarchical organization of OS file systems, another characteristic of most OS file systems is that they maintain certain system information about the files that they store. According to one embodiment, this OS file system characteristic is also emulated within the database system. Specifically, translation engine 308 issues commands that cause the "system" data for a file to be stored in a row of a files table (e.g. files table 710) managed by database server 204. According to one embodiment, all or most of the file contents is stored as a large binary object (BLOB) in one column of the row. In addition to the BLOB column, the files table further includes columns for storing attribute values that correspond to those implemented in OS file systems. Such attribute values include, for example, the owner or creator of the file, the creation date of the file, the last modification data of the file, the hard links to the file, the file name, the size of the file, and the file type.

When translation engine 308 issues database commands to database server 204 to perform any file operation, those database commands include statements which cause the attributes associated with the files involved in the operation to be modified appropriately. For example, in response to inserting a new row in the files table for a newly created file, translation engine 308 issues database commands to (1) store in the "owner" column of the row a value that indicates the user who is creating the file, and (2) store in the "creation date" column of the row a value that indicates the current date, and (3) store in the "last modify" column a value that indicates the current date and time, and (4) store in the "size" column a value that indicates the size of the BLOB. In response to subsequent operations on the file, the values in these columns are modified as required by the operations. For example, if translation engine 308 issues a database command that modifies the contents of a file stored in a particular row, then as part of the same operation the translation engine 308 issues a database command to update the "last modify" value of the particular row. Further, if the modification changes the size of the file, then translation engine 308 also issues a database command to update the "size" value of the particular row.

Another characteristic of most OS file systems is the ability to provide security on a file-by-file basis. For example, Windows NT, VMS and some versions of UNIX maintain access control lists that indicate the rights that various entities have with respect to each file. According to one embodiment of the invention, this OS file system characteristic is emulated within the database system by maintaining a "security table" where each row of the security table contains content similar to an entry of an access control list. For example, a row in the security table contains one column to store a value that identifies a file, another column to store a value that represents a permission type (e.g. read, update, insert, execute, change permission), another column that stores a flag to indicate whether the permission is granted or denied, and an owner column to store a value that represents the owner of that permission for that file. The owner may be a single user, identified by a userid, or a group, identified by a groupid. In the case of a group, one or more additional tables are used to map the groupid to the userids of the members of the group.

Prior to issuing database commands that access a file stored in the files table managed by database server 204, translation engine 308 issues database commands to verify that the user that is requesting the access has permission to perform the type of access requested for the specified file. Such pre-access database commands would retrieve data from the security table to determine whether the user that is requesting access has permission to perform the access. If the data thus retrieved indicates that the user does not have the required permission, then translation engine 308 does not issue the commands that perform the requested operation. Instead, translation engine 308 provides an error message back to the operating system from which the request originated. In response to the error message, the operating system sends the same OS error message to the application that requested the access as the operating system would send if the application had attempted to access, without permission, a file maintained in the OS file system of that operating system. Thus, even under error conditions, the fact that the data is stored in a relational database rather than in the OS file system is transparent to the application.

Different operating systems store different types of system information about files. For example, one operating system may store an "archive" flag but no icon information, while another may store icon information but no archive flag. The specific set of system data maintained by a database system that implements the techniques described herein may vary from implementation to implementation. For example, database server 204 may store all of the system data supported by the OS file system of operating system 304a, but only some of the system data supported by the OS file system of operating system 304b. Alternatively, database server may store all of the system data supported by both operating systems 304a and 304b, or less that all of the system data supported by any one of the operating systems 304a and 304b.

As illustrated in FIG. 3, database server 204 stores files that originate from numerous distinct OS file systems. For example, operating system 304a may be different from operating system 304b, and both operating systems 304a and 304b may be different from operating system 104. OS file systems 304a and 304b may have contradictory characteristics. For example, OS file system 304a may allow filenames to contain the character "/", while OS file system 304b may not. According to one embodiment, in situations such as this, translation engine 308 is configured to implement OS file system-specific rules. Thus, if application 302a attempts to store a file whose filename contains the character "/", translation engine 308 issues database commands to database server 204 to perform the operation. On the other hand, if application 302b attempts to store a file whose filename contains the character "/", then translation engine 308 raises an error.

Alternatively, translation engine 308 may be configured to implement a single set of rules for all operating systems. For example, translation engine 308 may implement the rule that if a filename is not valid in even one operating system supported by translation engine 308, then an error will be raised even if the filename is valid in the operating system that issued the command that specified the filename.

Translating Os File System Calls to Database Queries

Having built mechanisms to emulate OS file system characteristics within a database system, the translation of OS file system calls to database queries may be performed by translation engine 308 without losing the functionality expected by the applications that are making the OS file system calls. The OS file system calls made by those applications are made through the OS file API provided by the operating systems in which they are executing. For example, for programs written in the "C" programming language, a source code file entitled "stdio.h" is used to specify the interface of the OS file API of an operating system. The stdio.h file is included by applications so that the applications will know how to invoke the routines that implement the OS file API.

The specific routines that implement an OS file API may vary from operating system to operating system, but typically include routines to perform the following operations: open file, read from file, write to file, seek within a file, lock a file, and close file. In general, the mapping from those I/O commands to relational database commands is:

open file=begin transaction, resolve pathname to locate row that contains file
    write to file=update
    read from file=select
    lock file=lock row associated with file
    seek in file=update counter close file=commit transaction (the Windows OS file system protocol requires that the directory entry be committed immediately before the file data is written. Other protocols do not.)

As will be discussed in greater detail hereafter, some file systems expect the name of a file to be visible even before the contents of the file have been received. In the context of those file systems, the "open file" I/O command corresponds to a begin transaction for writing the name and a commit transaction for writing the name, as well as a begin transaction for writing the content.

According to one embodiment, a counter is used to track the "current location" within a file. In embodiments where the files are stored as BLOBs, the counter may take the form of an offset from the beginning of a BLOB. Upon the execution of an "open file" command, a counter is created and set to a value that indicates the starting address of the BLOB in question. The counter for a BLOB is then incremented in response to data being read from or written to the BLOB. Seek operations cause the counter to be updated to point to the location within the BLOB dictated by the seek operation's parameters. According to one embodiment, these operations are facilitated through the use of LOB Locators, as described in U.S. patent application Ser. No. 08/962,487 entitled "LOB LOCATORS", filed Oct. 31, 1997 by Non et. al., the entire contents of which is incorporated herein by reference.

In some operating systems, OS locks may persist beyond the closing of a file. To emulate this feature, the lock file command is translated to a request for a session lock. Consequently, when the "commit transaction" is performed in response to the close file command, the lock on the row associated with the file is not automatically released. The lock thus established is released either explicitly in response to an unlock file command, or automatically in response to the termination of the database session through which the lock was acquired.

In-Progress I/O Operations

When a file is created, the directory in which the file is created is updated to indicate the presence of the file. In some OS file systems, the modification to a directory to show a new file is committed before the new file is entirely generated. Some applications designed for those OS file systems take advantage of that feature. For example, an application may open a new file with a first file handle, and proceed to write data into the file. While the data is being written, the same application may open the file with a second file handle.

Emulating this feature within the database involves special issues because, in general, until a database transaction commits, another transaction is not able to see the changes made by the transaction. For example, assume that a first database transaction is initiated in response to the first "open" command. The first transaction updates a directory table to indicate that the file exists in a particular directory, and then updates a files table to insert a row that contains the file. If a second database transaction is initiated in response to a second open command, issued by the same application, the second database transaction will not see either the change to the directory table nor the new row in the files table until the first transaction commits.

According to one embodiment of the invention, the ability to see the directory entry of a file whose creation is in progress is emulated in a database system by causing the update to the directory table to be performed as a separate transaction than the transaction used to insert the row for the file in the files table. Thus, in response to the first open command, translation engine 308 issues database commands to (1) start a first transaction, (2) change the directory table to indicate the existence of the new file, (3) commit the first transaction, (4) start a second transaction, (5) insert a row for the file into the files table, and (6) commit the second transaction. By committing the change to the directory table separate from the change to the files table, a third transaction, initiated in response to a second open command, may see the entry in the directory table while the insertion into the files table is still in progress. If the second transaction fails, then the directory will be left with an entry for a file with no content.

The Translation Engine

Figure 4:
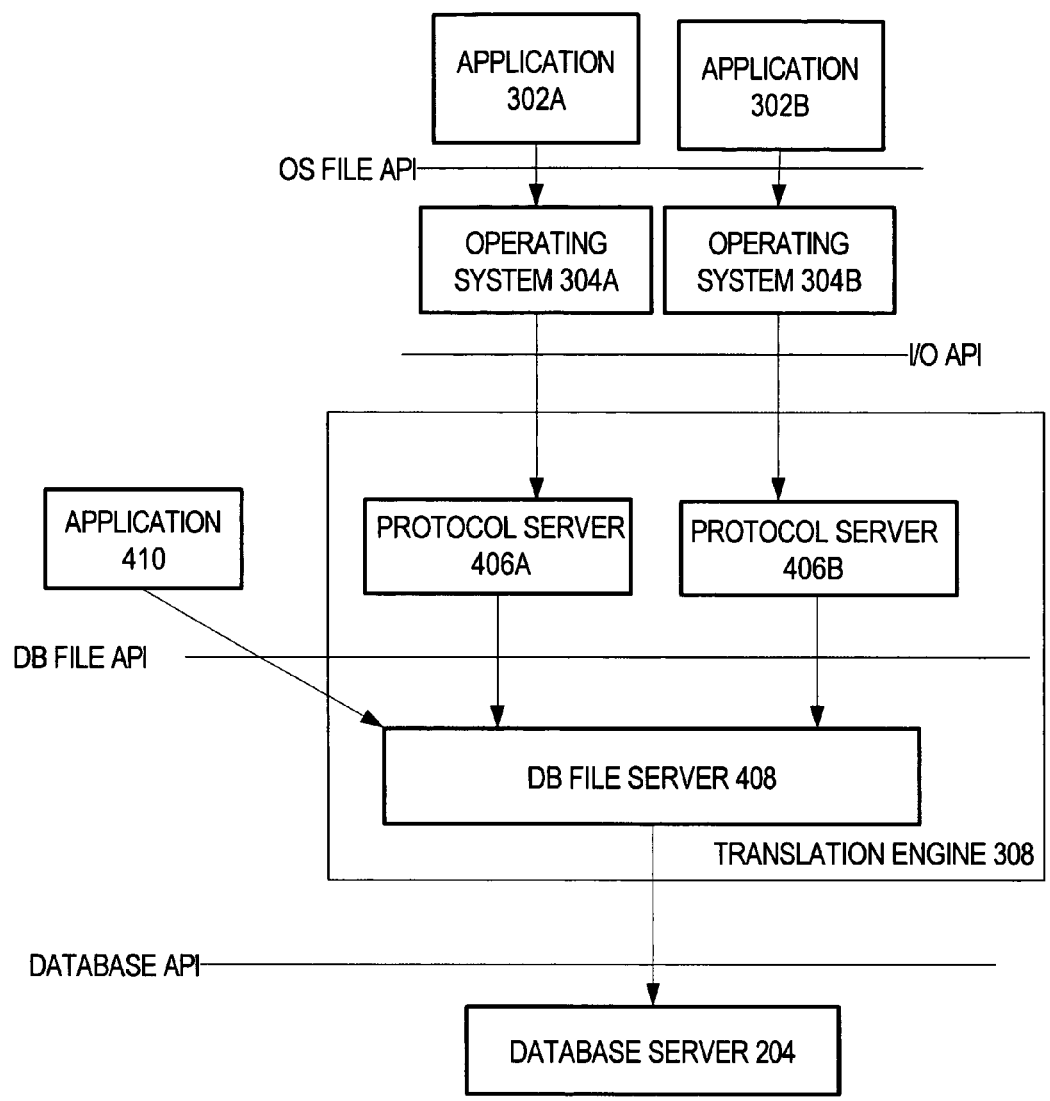
FIG. 4 is a block diagram that illustrates translation engine 308 in greater detail.

According to one embodiment of the invention, translation engine 308 is designed in two layers. Those layers are illustrated in FIG. 4. Referring to FIG. 4, translation engine 308 includes a protocol server layer, and a DB file server 408 layer. DB file server 408 allows applications to access data stored in the database managed by database server 204 through an alternative API, referred to herein as the DB file API. The DB file API combines aspects of both an OS file API and the database API. Specifically, the DB file API supports file operations similar to those supported by conventional OS file APIs.

However, unlike OS file APIs, the DB file API incorporates the database API concept of transactions. That is, the DB file API allows applications to specify that a set of file operations are to be performed as an atomic unit. The benefits of having a transacted file system are described in greater detail hereafter.

DB File Server

The DB file server 408 is responsible for translating DB file API commands to database commands. The DB file API commands received by DB file server 408 may come from the protocol server layer of translation engine 308, or directly from applications (e.g. application 410) specifically designed to perform file operations by issuing calls through the DB file API.

According to one embodiment, DB file server 408 is object oriented. Thus, the routines supplied by DB file server 408 are invoked by instantiating an object and calling methods associated with the object. In one implementation, the DB file server 408 defines a "transaction" object class that includes the following methods: insert, save, update, delete, commit and roll-back. The DB file API provides an interface that allows external entities to instantiate and use the transaction object class.

Specifically, when an external entity (e.g. application 410 or a protocol server) makes a call to DB file server 408 to instantiate a transaction object, DB file server 408 sends a database command to database server 204 to begin a new transaction. The external entity then invokes the methods of the transaction object. The invocation of a method results in a call to DB file server 408. DB file server 408 responds to the call by issuing corresponding database commands to database server 204. All database operations that are performed in response to the invocation of methods of a given transaction object are performed as part of the database transaction associated with the given transaction object.

Significantly, the methods invoked on a single transaction object may involve multiple file operations. For example, application 410 may interact with DB file server 408 as follows: Application 410 instantiates a transaction object TXO1 by making a call through the DB file API. In response, DB file server 408 issues a database command to start a transaction TX1 within database server 204. Application 410 invokes the update method of TXO1 to update a file F1 stored in the database managed by database server 204. In response, DB file server 408 issues a database command to database server 204 to cause the requested update to be performed as part of transaction TX1. Application 410 invokes the update method of TXO1 to update a second file F2 stored in the database managed by database server 204. In response, DB file server 408 issues a database command to database server 204 to cause the requested update to be performed as part of transaction TX1. Application 410 then invokes the commit method of TXO1. In response, DB file server 408 issues a database command to database server 204 to cause TX1 to be committed. If the update to file F2 had failed, then the roll-back method of TXO1 is invoked and all changes made by TX1, including the update to file F1, are rolled back.

While techniques have been described herein with reference to a DB file server that uses transaction objects, other implementations are possible. For example, within the DB file server, objects may be used to represent files rather than transactions. In such an implementation, file operations may be performed by invoking the methods of the file objects, and passing thereto data that identifies the transaction in which the operations are to be executed. Thus, the present invention is not limited to a DB file server that implements any particular set of object classes.

For the purpose of explanation, the embodiment illustrated in FIG. 4 shows DB file server 408 as a process executing outside database server 204 that communicates with database server 204 through the database API. However, according to an alternative embodiment, the functionality of DB file server 408 is built into database server 204. By building DB file server 408 into database server 204, the amount of inter-process communication generated during the use of the DB file system is reduced. The database server produced by incorporating DB file server 408 into database server 204 would therefore provide two alternative APIs for accessing data managed by the database server 204: the DB file API and the database API (SQL).

Protocol Servers

The protocol server layer of translation engine 308 is responsible for translating between specific protocols and DB file API commands. For example, protocol server 406a translates I/O commands received from operating system 304a to DB file API commands that it sends to DB file server 408. Protocol server 406a also translates DB file API commands received from DB file server 408 to I/O commands that it sends to operating system 304a.

In practice, there is not a one-to-one correspondence between protocols and operating systems. Rather, many operating systems support more than one protocol, and many protocols are supported by more then one operating system. For example, a single operating system may provide native support for one or more of network file protocols (SMB, FTP, NFS), e-mail protocols (SMTP, IMAP4), and web protocols (HTTP). Further, there is often an overlap between the sets of protocols that different operating systems support. However, for the purpose of illustration, a simplified environment is shown in which operating system 304A supports one protocol, and operating system 304b supports a different protocol.

The I/O API

As mentioned above, protocol servers are used to translate I/O commands to DB file commands. The interface between the protocol servers and the OS file systems with which they communicate is generically labeled I/O API. However, the specific I/O API provided by a protocol server depends on both (1) the entity with which the protocol server communicates, and (2) how the protocol server is to appear to that entity. For example, operating system 304a may be Microsoft Windows NT, and protocol server 406a may be designed to appear as a device driver to Microsoft Windows NT. Under those conditions, the I/O API presented by protocol server 406a to operating system 304a would be a type of device interface understood by Windows NT. Windows NT would communicate with protocol server 406a as it would any storage device. The fact that files stored to and retrieved from protocol server 406a are actually stored to and retrieved from a database maintained by database server 204 is completely transparent to Windows NT.

While some protocol servers used by translation engine 308 may present device driver interfaces to their respective operating systems, other protocol servers may appear as other types of entities. For example, operating system 304a may be the Microsoft Windows NT operating system and protocol server 406a presents itself as a device driver, while operating system 304b is the Microsoft Windows 95 operating system and protocol server 406b presents itself as a System Message Block (SMB) server. In the latter case, protocol server 406b would typically be executing on a different machine than the operating system 304b, and the communication between the operating system 304b and protocol server 406b would occur over a network connection.

In the examples given above, the source of the I/O commands handled by the protocol servers are OS file systems. However, translation engine 308 is not limited to use with OS file system commands. Rather, a protocol server may be provided to translate between the DB file commands and any type of I/O protocol. Beyond the I/O protocols used by OS file systems, other protocols for which protocol servers may be provided include, for example, the File Transfer Protocol (FTP) and the protocols used by electronic mail systems (POP3 or IMAP4).

Just as the interface provided by the protocol servers that work with OS file systems is dictated by the specific OS, the interface provided by the protocol servers that work with non-OS file systems will vary based on the entities that will be issuing the I/O commands. For example, a protocol server configured receive I/O commands according to the FTP protocol would provide the API of an FTP server. Similarly, protocol servers configured to receive I/O commands according to the HTTP protocol, the POP3 protocol, and the IMAP4 protocol, would respectively provide the APIs of an HTTP server, a POP3 server, and an IMAP4 server.

Similar to OS file systems, each non-OS file protocol expects certain attributes to be maintained for its files. For example, while most OS file systems store data to indicate the last modified date of a file, electronic mail systems store data for each e-mail message to indicate whether the e-mail message has been read. The protocol server for each specific protocol implements the logic required to ensure that the semantics its protocol are emulated in the database file system.

Transacted File System

Within database systems, operations are generally performed as part of a transaction. The database system performs all of the operations that are part of a transaction as a single atomic operation. That is, either all of the operations are completed successfully, or none of the operations are performed. During the execution of a transaction, if an operation cannot be performed, all of the previously executed operations of that transaction are undone or "rolled back".

In contrast to database systems, OS file systems are not transaction based. Thus, if a large file operation fails, the portion of the operation that was performed prior to the failure remains. The failure to undo incomplete file operations can lead to corrupt directory structures and files.

According to one aspect of the invention, a transacted file system is provided. As mentioned above, translation engine 308 converts I/O commands to database statements that are sent to database server 204. The series of statements sent by translation engine 308 to execute a specified I/O operation is preceded by a begin transaction statement, and ended with a close transaction statement. Consequently, if any failure occurs during the execution of those statements by database server 204, then all of the changes made as part of that transaction by database server 204 up to the point of the failure will be rolled back.

The events that cause the failure of a transaction may vary based on the system from which the I/O commands originate. For example, an OS file system may support the concept of signatures, where a digital "signature" identifying the source of a file is appended to the file. A transaction that is initiated to store a signed file may fail, for example, if the signature of the file being stored is not the expected signature.

On-the-Fly Intelligent File Conversion

Figure 9:
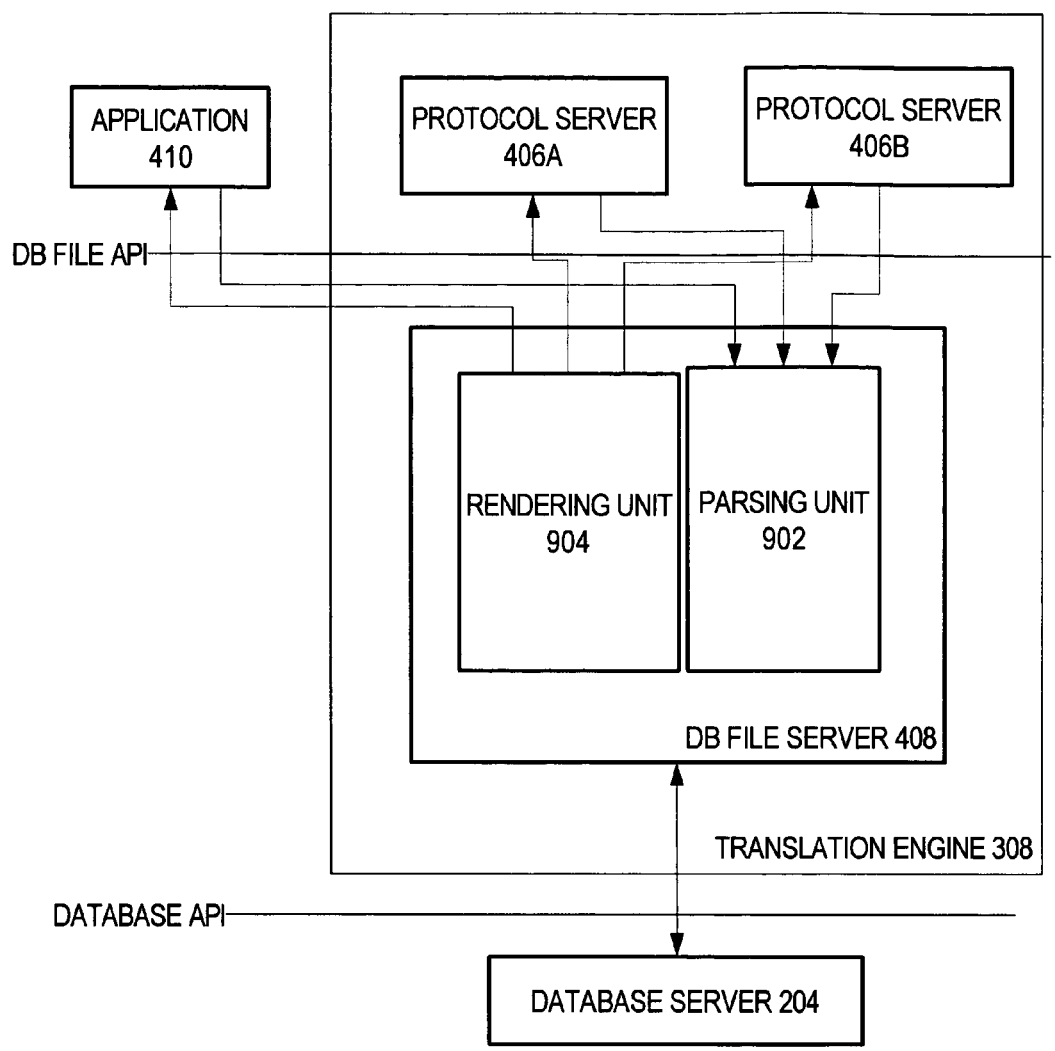
FIG. 9 is a block diagram that illustrates a database file server in greater detail.

According to one aspect of the invention, files are processed prior to insertion into a relational database, and processed again as they are retrieved from the relational database. FIG. 9 is a block diagram that illustrates the functional components of DB file server 308 that are used to perform the inbound and outbound file processing.

Referring to FIG. 9, translation engine 308 includes a rendering unit 904 and a parsing unit 902. In general, parsing unit 902 is responsible for performing the inbound processing of files, and rendering unit 904 is responsible for performing the outbound processing of files. Each of these functional units shall now be described in greater detail.

Inbound File Processing

Inbound files are passed to DB file server 408 through the DB file API. Upon receiving an inbound file, parsing unit 902 identifies the file type of the file, and then parses the file based on its file type. During the parsing process, parsing unit 902 extracts structured information from the file being parsed. The structured information may include, for example, information about the file being parsed, or data that represents logically distinct components or fields of the file. This structured information is stored in the database along with the file from which the structured information was generated. Queries may then be issued to the database server to select and retrieve files based on whether the structured information thus extracted satisfies particular search criteria.

The specific techniques used by parsing unit 902 to parse a document, and the structured data generated thereby, will vary based on the type of document that is passed to the parsing unit 902. Thus, prior to performing any parsing operations, parsing unit 902 identifies the file type of the document. Various factors may be taken into account to determine the file type of a file. For example, in DOS or Windows operating systems, the file type of a file is frequently indicated by an extension in the filename of the file. Thus, if the filename ends in ".txt", then parser unit 902 classifies the file as a text file, and applies the text-file-specific parsing techniques to the file. Similarly, if the filename ends in ".doc", then parser unit 902 classifies the file as a Microsoft Word document and applies Microsoft-Word-specific parsing techniques to the file. In contrast, the Macintosh Operating System stores file type information for a file as a attribute maintained separate from the file.

Other factors that may be considered by parsing unit 902 to determine the file type of a file include, for example, the directory in which the file is located. Thus, parser unit 902 may be configured to classify and parse all files that are stored in the \WordPerfect\documents directory as WordPerfect documents, regardless of the filenames of those files.

Alternatively, both the file type of an inbound file and the file type required by a requesting entity may be specified by or inferred through information provided to DB file server 408. For example, when a web browser sends a message, the message typically includes information about the browser (e.g. the browser type, version, etc.). When a web browser requests a file through an HTTP protocol server, this information is passed to DB file server 408. Based on this information, rendering unit 904 may look up information about the capabilities of the browser and infer from those capabilities the best file type to deliver to the browser.

As mentioned above, the specific parsing techniques used by parsing unit 902, and the type of structured data thus generated, will vary based on the type of file that is being parsed. For example, the structured data generated by parsing unit 902 may include embedded metadata, derived metadata, and system metadata. Embedded metadata is information embedded within the file itself. Derived metadata is information that is not contained within the file, but which can be derived by analyzing the file. System metadata is data about the file provided by the system from which the file originates.

For example, assume that application 410 passes a Microsoft Word document to parsing unit 902. Parsing unit 902 parses the document to extract information about the file that is embedded within the file. The information embedded in a Microsoft Word document, for example, may include data that indicates the author of the document, a category to which the document has been assigned, and comments about the document.

In addition to locating and extracting embedded information about the Word document, parser 902 may also derive information about the document. For example, parser 902 may scan the Word document to determine how many pages, paragraphs and words are contained in the document. Finally, the system in which the document originated may supply to parsing unit 902 data that indicates the size, creation date, last modification date, and file type of the document.

The more structured the file type of a document, the easier it is to extract specific items of structured data from the document. For example, an HTML document typically has delimiters or "tags" that specify the beginning and end of specific fields (title, heading1, heading2, etc). These delimiters may be used by parsing unit 902 to parse the HTML document, thus producing an item of metadata for some or all of the delimited fields. Similarly, XML files are highly structured, and the XML parser could extract a separate item of metadata for some or all of the fields contained in the XML document.

Once the parsing unit 902 has generated structured data for a file, DB file server 408 issues database commands to database server 204 to cause the file to be inserted into a row of a files table (e.g. files table 710). According to one embodiment, the database commands thus issued store the file as a BLOB in one column of the row, and store the various items of structured data generated for the file in other columns of the same row.

Alternatively, some or all of the structured data items for a file may be stored outside the files table. Under such circumstances, the rows that store structured data associated with a file would typically contain data that identifies the file. For example, assume that a Word document is stored in row R20 of the files table, and that the system metadata (e.g. creation date, modification date, etc.) for that Word document is stored in row R34 of a system attributes table. Under these circumstances, both R20 of the files table and R34 of the system attributes table would typically contain a FileID column that stores a unique identifier for the Word document. Queries can then retrieve both the file and the system metadata about the file by issuing a join statement that joins rows in the files table to rows in the system attributes table based on the FileID values. A technique for storing file attributes in tables associated with file "classes" is described in greater detail hereafter.

Outbound File Processing

Outbound files are constructed by rendering unit 904 based on information retrieved in response to database commands sent to database server 204. Once constructed, an outbound file is delivered, through the DB file API, to the entity that requested it.

Significantly, the file type of the outbound file produced by rendering unit 904 (the target file type) is not necessarily the same file type as the file that produced the data that is used to construct the outbound file (the source file type). For example, rendering unit 904 may construct a text file based on data that was originally stored within the database as a Word file.

Further, the entity requesting an outbound file may be on an entirely different platform, and using an entirely different protocol, than the entity that produced the file from which the outbound file is constructed. For example, assume that protocol server 406b implements an IMAP4 server interface, and that protocol server 406a implements an HTTP server interface. Under these conditions, an e-mail document that originates from an e-mail application may be stored into the database through protocol server 406b, and retrieved from the database by a Web browser through protocol server 406a. In this scenario, parsing unit 902 would invoke the parsing techniques associated with the e-mail file type (e.g. RFC822), and rendering unit would invoke the rendering routines that construct an HTML document from the e-mail data retrieved from the database.

Parser And Renderer Registration

As mentioned above, the parsing techniques applied to a file are dictated by the type of the file. Similarly, the rendering techniques applied to a file are dictated by both the source type of the file and the target type of the file. The number of file types that exist across all computer platforms is enormous. Thus, it is not practical to build a parsing unit 902 that handles all known file types, nor a rendering unit 904 that handles all possible file-type to file-type conversions.

According to one embodiment of the invention, the problem caused by the proliferation of file types is addressed by allowing type-specific parsing modules to be registered with parsing unit 902, and type-specific rendering modules to be registered with rendering unit 904. A type-specific parsing module is a module that implements the parsing techniques for a specific file type. For example, Word documents may be parsed using a Word Document parsing module, while POP3 e-mail documents are parsed using a POP3 e-mail parsing module.

Similar to type-specific parsing modules, type-specific rendering modules are modules that implement the techniques for converting data associated with one or more source file types into one or more target file types. For example, a type-specific rendering module may be provided for converting Word documents into text documents.

In some cases, conversion may be required even when the source and target file types are the same. For example, when parsed and inserted into the database, the contents of an XML document may not be maintained in a single BLOB, but spread over numerous columns of numerous tables. In that case, XML is the source file type of that data, even though that data is no longer stored as an XML file. A type-specific rendering module may be provided to construct an XML document from that data.

When an inbound file is received by parsing unit 902, parsing unit 902 determines the file type of the file and determines whether a type-specific parsing module has been registered for that file type. If a type-specific parsing module has been registered for that file type, then parsing unit 902 calls the parsing routines provided by that type-specific parsing module. Those parsing routines parse the inbound file to generate metadata, which metadata is then stored into the database along with the file. If a type-specific parsing module has not been registered for the file type, then parsing unit 902 may raise an error or, alternatively, apply a generic parsing technique to the file. Because the generic parsing technique would not have any knowledge about the content of the file, the generic parsing technique would be limited with respect to the useful metadata it could generate for the file.

When a file request is received by rendering unit 904, rendering unit 904 issues database commands to retrieve the data associated with the file. That data includes metadata that indicates the source file type of the file. Rendering unit 904 then determines whether a type-specific rendering module has been registered for that source file type. If a type-specific rendering module has been registered for that source file type, then rendering unit 904 invokes the rendering routines provided by that type-specific rendering module to construct a file, and provides the file thus constructed to the entity requesting the file.

Various factors may be used to determine which target file type should selected by a type-specific rendering module. In some cases, the entity requesting the file may explicitly indicate the type of file it requires. For example, a text editor may only be able to handle text files. The text editor may request a file whose source file type is a Word Document. In response to the request, a Word-specific rendering module may be invoked which, based on the required target file type, converts the Word document to a text file. The text file is then delivered to the text editor.

In other cases, the entity requesting the file may support numerous file types. According to one embodiment, the type-specific rendering module incorporates logic that (1) identifies a set of file types that are supported by both the requesting entity and the type-specific rendering module, and (2) selects the best target file type in that set. The selection of the best target file type may take into account various factors, including the specific characteristics of the file in question.

For example, assume that (1) DB file server 408 receives a request for a file, (2) the source file type for the file indicates that the file is a "BMP" image, (3) the request was initiated by an entity that supports "GIF", "TIF" and "JPG" images, (4)

the BMP source type-specific rendering module supports target file types of "GIF", "JPG" and "PCX". Under these conditions, the BMP source type-specific rendering module determines that both "GIF" and "JPG" are possible target file types. To select between the two possible target file types, the BMP source type-specific rendering module may taking into account information about the file, including its resolution and color depth. Based on this information, the BMP source type-specific rendering module may determine that JPG is the best target file type, and then proceed to convert the BMP file into a JPG file. The resulting JPG file is then delivered to the requesting entity.

According to one embodiment, type-specific parsing and rendering modules are registered by storing information in a database table that indicates the capabilities of the module. For example, the entry for a type-specific rendering module may indicate that it should be used when the source file type is XML and the requesting entity is a Windows-based Web Browser. The entry for a type-specific parsing module may indicate that it should be used when the source file type is a .GIF image.

When the DB file server 408 receives a file-related command through DB file API, the DB file server 408 determines the file type at issue, and the identity of the entity that issued the command. DB file server 408 then issues database commands to database server 204 which cause database server 204 to scan the table of registered modules to select the appropriate module to use under the current circumstances. In the case of an inbound file, the appropriate parsing module is invoked to parse the file before it is inserted into the database. In the case of an outbound file, the appropriate rendering module is invoked to construct the outbound file from data retrieved from the database.

According to an embodiment of the invention, the DB file system allows file classes to be defined using object oriented techniques, where each file type belongs to a file class, and file classes can inherit attributes from other file classes. In such a system, the file class of a file may be a factor used in determining the appropriate parser and renderer for the file. The use of file classes shall be described in greater detail hereafter.

Stored Query Directories

As explained above, a hierarchical directory structure may be implemented in a database system using a files table 710, where each row corresponds to a file. A hierarchical index 510 may be employed to efficiently locate the row associated with a specified file based on the pathname of the file.

In the embodiment illustrated in FIGS. 5 and 7, the child files of each directory are explicitly enumerated. In particular, the child files of each directory are enumerated in the Dir_entry_list of the index entry associated with the directory. For example, index entry 512 corresponds to the Windows directory 614, and the Dir_entry_list of index entry 512 explicitly enumerates "Word" and "Access" as the child files of Windows directory 614.

According to one aspect of the invention, a file system is provided in which the child files of some or all directories are not explicitly enumerated, but instead are dynamically determined based on the search results of stored queries. Such directories are referred to herein as stored query directories.

For example, assume that a file system user desires to group all files with the extension .doc into a single directory. With conventional file systems, the user would create a directory, search for all files with the extension .doc, and then either move the files found by the search into the newly created directory, or create hard links between the newly created directory and the files found by the search. Unfortunately, the contents of the newly created directory only accurately reflects the state of the system at the time the search was performed. Files would remain in the directory if renamed to something that did not have the .doc extension. In addition, files with the .doc extension that are created in other directories after the new directory is established would not be included in the new directory.

Rather than statically define the membership of the new directory, the membership of the directory may be defined by a stored query. A stored query that selects the files that have the extension .doc may appear as follows:

Q1:
SELECT * from files_table
where
files_table.Extension="doc"

Referring to FIG. 7, when executed against table 710, the query Q1 selects rows R4 and R12, which are the rows for the two documents entitled "Example.doc".

According to one embodiment of the invention, a mechanism is provided to link queries, such as query Q1, to directory entries in the hierarchical index 510. During the traversal of the hierarchical index 510, when a directory entry that contains such a link is encountered, the query identified by the link is executed. Each file selected by the query is treated as a child of the directory associated with the directory entry, just as if the file had been an explicit entry in the database table that stores directory entries.

For example, assume that a user desires to create a directory "Documents" that is a child of Word 616, and desires the document directory to contain all files that have the extension .doc. According to one embodiment of the invention, the user designs a query that specifies the selection criteria for the files that are to belong to the directory. In the present example, the user may generate query Q1. The query is then stored into the database system.

Similar to other types of directories, a row for the Document directory is added to the files table 710, and an index entry for the Document directory is added to the hierarchical index 510. In addition, the Dir_Entry_list of the index entry for the Word directory is updated to indicate that the new Document directory is a child of the Word directory. Rather than explicitly list children in a Dir_Entry_list, the new directory entry for the Document directory contains a link to the stored query.

Figure 10:
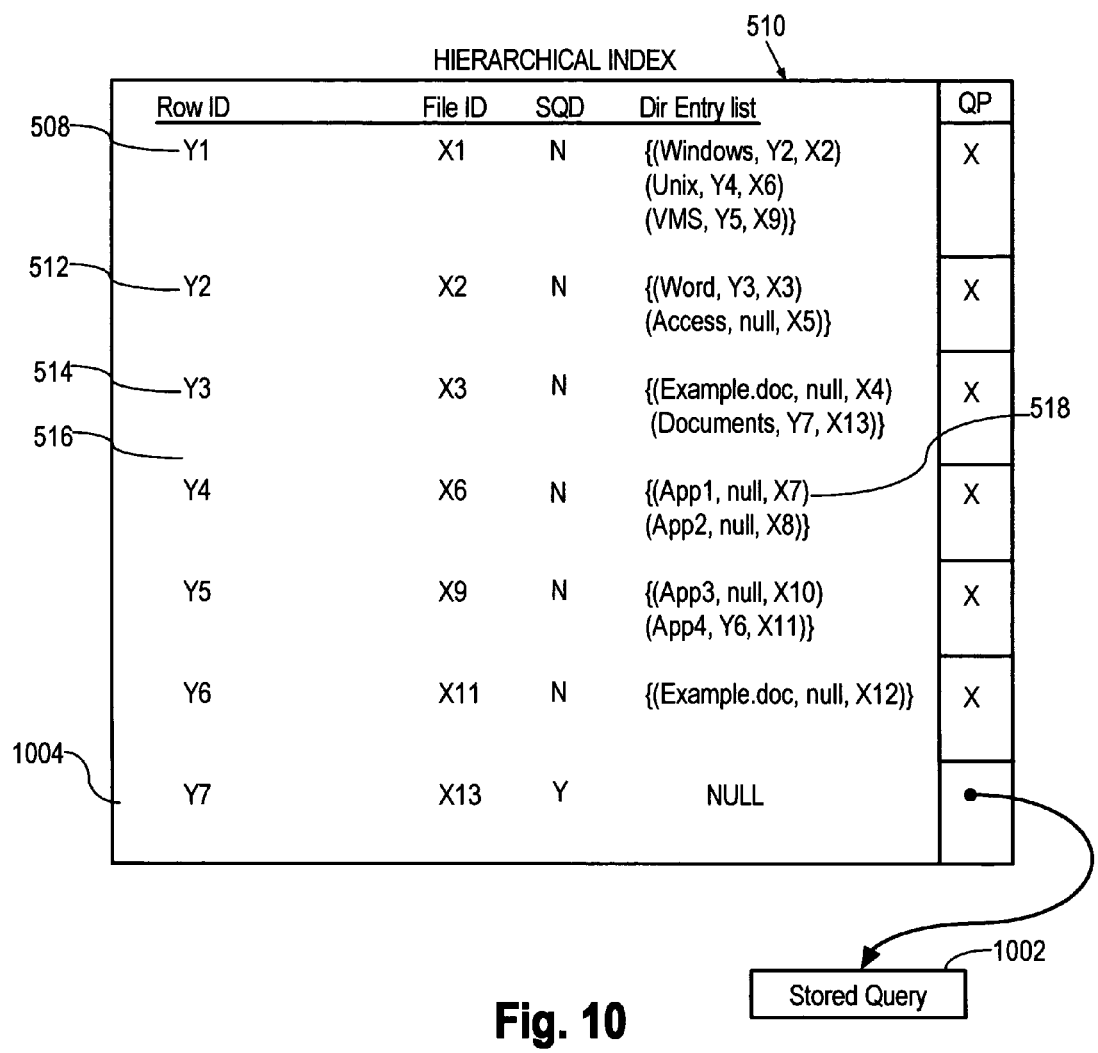
FIG. 10 is a block diagram of a hierarchical index that includes an entry for a stored query directory.

FIGS. 10 and 11 respectively show the state of hierarchical index 510 and files table 710 after the appropriate entries have been created for the Documents directory. Referring to FIG. 10, an index entry 1004 has been created for the Documents directory. Because the children of the Documents directory are determined dynamically based on the result set of a stored query, the Dir_entry_list field of the index entry 1004 is null. Instead of a static enumeration of child files, the index entry 1004 includes link to the stored query 1002 that is to be executed to determine the child files of the Documents directory.

In addition to the creation of index entry 1004 for the Documents directory, the existing index entry 514 for the Word directory is updated to indicate that Documents is a child of the Word directory. Specifically, a Dir_entry_list array entry is added to index entry 514 that identifies the name "Documents", the RowID of the index entry for the Documents directory (i.e. Y7), and the FileID of the Documents directory (i.e. X13).

In the illustrated embodiment, two columns have been added to the hierarchical index 510. Specifically, a Stored Query Directory (SQD) column contains a flag to indicate whether the directory entry is for a stored query directory. In the directory entries for stored query directories, a Query Pointer (QP) column stores a link to the stored queries associated with the directories. In directory entries for directories that are not stored query directories, the QP column is null.

The nature of the link may vary from implementation to implementation. For example, according to one implementation, the link may be a pointer to the storage location at which the stored query is stored. According to another implementation, the link may simply be a unique stored query identifier that may be used to look up the stored query in a stored query table. The present invention is not limited to any particular type of link.

Referring to FIG. 11, it illustrates files table 710 as updated to include a row (R13) for the Documents directory. According to one embodiment, the same metadata that is maintained for conventional directories is also maintained for the Documents directory. For example, row R13 may include a creation date, a last modification date, etc.

Figure 12:
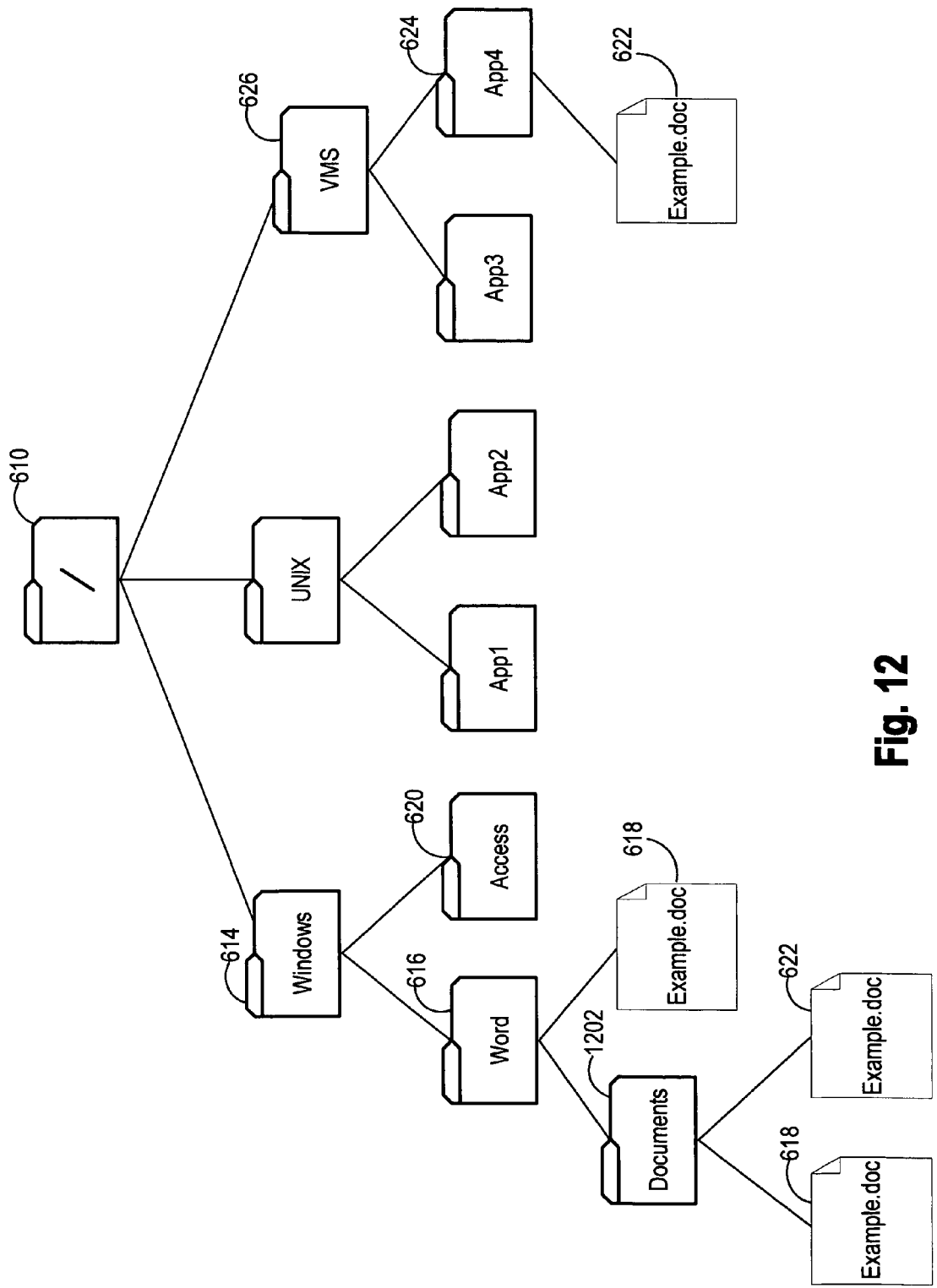
FIG. 12 is a block diagram that illustrates a file hierarchy that includes a stored query directory.

FIG. 12 is a block diagram of a file hierarchy. The hierarchy shown in FIG. 12 is the same as that of FIG. 6, with the addition of the Documents directory 1202. When any application requests a display of the contents of the Documents directory 1202, the database executes the query associated with the Documents directory 1202. The query selects the files that satisfy the query. The results of the query are then presented to the application as the contents of the Documents directory 1202. At the time illustrated in FIG. 12, the file system only includes two files that satisfy the query associated with the Documents directory 1202. Those two files are both entitled Example.doc. Thus, the two Examples.doc files 618 and 622 are shown as children of the Documents directory 1202.

In many OS file systems, the same directory cannot store two different files with the same name. Thus, the existence of two files entitled Examples.doc within Documents directory 1202 may violate the OS file system conventions. Various techniques may be used address this issue. For example, the DB file system may append characters to each filename to produce unique filenames. Thus, Example.doc 618 may be presented as Example.doc1, while Example.doc 622 is presented as Example.doc2. Rather than append characters that convey no particular information, the appended characters may be selected to convey meaning. For example, the appended characters may indicate the path to the directory in which the file is a statically located. Thus, Example.doc 618 may be presented as Example.doc_Windows_Word, while Example.doc 622 is presented as Example.doc_VMS_App4. Alternatively, stored query directories may simply be allowed to violate the OS file system conventions.

In the embodiment shown in FIG. 10, the child files of a given directory are either all statically defined, or all defined by a stored query. However, according to one embodiment of the invention, a directory may have some statically defined child files, and some child files that are defined by a stored query. For example, rather than having a null Dir_entry_list, index entry 1004 could have a Dir_entry_list that statically specifies one or more child files. Thus, when the an application asks the database system to specify the children of the Documents directory, the database server would list the union of the statically defined child files and the child files that satisfy the stored query 1002.

Significantly, the stored query that identifies the child files of a directory may select other directories as well as documents. Some or all of those other directories may themselves be stored query directories. Under some circumstances, the stored query of a particular directory may even select the particular directory itself, causing the directory to be its own child.

Because the child files of stored query directories are determined on-the-fly, a listing of the child files will always reflect the current state of the database. For example, assume that a "Documents" stored query directory is created, as described above. Every time a new file is created with the extension .doc, the file automatically becomes a child of the Documents directory. Similarly, if the extension of a file is changed from .doc to .txt, the file will automatically cease to qualify as a child of the Documents directory.

According to one embodiment, the query associated with a stored query directory may select certain database records to be the child files of the directory. For example, a directory entitled "Employees" may be linked to a stored query that selects all rows from an Employee table within the database. When an application requests the retrieval of one of the virtual employee files, a renderer uses the data from the corresponding employee record to generate a file of the file type expected by the requesting application.

Stored Query Documents

Just as stored queries may be used to specify the child files of a directory, stored queries may also be used to specify the contents of a document. Referring to FIGS. 7 and 11, they illustrate files table 710 with a Body column. For directories, the Body column is null. For documents, the Body column contains a BLOB that contains the document. For a file whose contents are specified by a stored query, the BODY column may contain a link to the stored query. When an application requests the retrieval of a stored query document, the stored query that is linked to the row associated with the stored query document is executed. The content of the document is then constructed based on the result set of the query. According to one embodiment, the process of constructing the document from the query results is performed by a renderer, as described above.

In addition to providing support for documents whose contents are entirely dictated by the results of a stored query, support may also be provided for documents in which some portions are dictated by the results of a query, while other portions are not. For example, the Body column of a row in the document directory may contain a BLOB, while another column contains a link to a stored query. When a request is received for the file associated with that row, the query may be executed, and the results of the query may be combined with the BLOB during the rendering of the file.

Multiple-Level Stored Query Directories

As mentioned above, a stored query may be used to dynamically select the child files of a directory. The child files of a directory all belong to the same level in the file hierarchy (i.e. the level immediately below the directory associated with the stored query). According to one embodiment, the stored query associated with a directory may define multiple levels below the directory. Directories that are associated with queries that define multiple levels are referred to herein as multiple-level stored query directories.

For example, a multiple-level stored query directory may be associated with a query that selects all employee records in an employee table, and groups those employees records by department and by region. Under these conditions, separate hierarchical levels may be established for each grouping key (department and region) and for the employee records. Specifically, the results of such a query may be presented as three different levels in the file hierarchy. The child files of the directory would be determined by the first grouping criteria. In the present example, the first grouping criteria is "department". Hence, the child files of the directory may be the various department values: "Dept1", "Dept2" and "Dept3". These child files would themselves be presented as directories.

The child files of the department directories would be determined by the second grouping criteria. In the present example, the second grouping criteria is "region". Thus, each department directory would have a child file for each of the region values, such as "North", "South", "East", "West". The region files would also be presented as directories. Finally, the child files of each region directory would be files that correspond to the particular department/region combination associated with the region directory. For example, the children of the \Dept1\East directory would be the employees that are in Department 1 in the East region.

Handling File Operations on the Child Files of a Stored Query Directory

As mentioned above, the child files of a stored query directory are presented to applications in the same manner as the child files of conventional directories. However, certain file operations that may be performed to the child files of conventional directories present special issues when performed on the child files of a stored query directory.

For example, assume that a user enters input that specifies that a child file of a stored query directory should be moved to another directory. This operation presents a problem because the child file belongs to the stored query directory by virtue of satisfying the criteria specified in the stored query associated with the directory. Unless the file is modified in a way that causes the file to cease to satisfy that criteria, the file will continue to qualify as a child file of the stored query directory.

A similar problem occurs when an attempt is made to move a file into a stored query directory. If the file is not already a child of the stored query directory, then the file does not satisfy the stored query associated with the stored query directory. Unless the file is modified in a way that causes the file to satisfy the criteria specified by the stored query, the file should not be a child of the stored query directory.

Various approaches may be taken to resolve these issues. For example, the DB file system may be configured to raise an error in response to operations that attempt to move files into or out of stored query directories. Alternatively, the DB file system may respond to such attempts by deleting the file in question (or the database record that is being presented as a file).

In yet another approach, files that are moved into a stored query directory may be automatically modified so that they satisfy the criteria of the stored query associated with the directory. For example, assume that the stored query associated with a stored query directory selects all employees that are married. If a file that corresponds to an employee record is moved to that stored query directory, the "married" field of the employee record is updated to indicate that the employee is married.

Similarly, files that are moved out of a stored query directory may be automatically modified so that they cease to satisfy the criteria of the stored query associated with the directory. For example, if a file in the "married employee" stored query directory is moved out of the directory, then the "married" field of the corresponding employee record is updated to indicate that the employee is not married.

When an attempt is made to move a file that does not satisfy the criteria of a stored query into the corresponding stored query directory, another approach is to update the index entry for the stored query directory to statically establish the file as a child of the stored query directory. Under those circumstances, the stored query directory would have some child files that are child files because they satisfy the stored query, and other child files that are child files because they have been manually moved to the stored query directory.

Programmatically Defined Files

Stored query directories and stored query documents are examples of programmatically defined files. A programmatically defined file is an entity that is presented to the file system as a file (e.g. a document or a directory), but whose contents and/or child files are determined by executing code. The code that is executed to determine the contents of the file may include a stored database query, as in the case of stored query files, and/or other code. According to one embodiment, the code associated with a programmatically defined file implements the following routines:

resolve_filename(filename): child_file_handle;
    list_directory;
    fetch;
    put;
    delete;

The resolve_filename routine returns a file handle of a file that has the name "filename" and is a child of the programmatically defined file. The list_directory routine returns a listing of all child files of the programmatically defined file. The fetch routine retrieves the contents of the programmatically defined file. The put routine inserts data into the programmatically defined file. The delete routine deletes the programmatically defined file.

According to one embodiment, a "resolve_pathname(path): file_handle" routine is also provided. The resolve_pathname routine receives a path and iteratively calls the resolve_filename function for each filename in the path.

According to one embodiment, the DB file system provides an object class that implements the above-listed routines for conventional files (i.e. files that are not programmatically defined). For the purpose of explanation, that object class shall be referred to herein as the "directory class". To implement a programmatically defined file, a subclass of the directory class is established. The subclass inherits the routines of the directory class, but allows the programmer to override the implementations of those routines. The implementations provided by the subclass dictate the operations performed by the DB file system in response to file operations involving the programmatically defined file.

Event Notification within a File System

According to one aspect of the invention, a file system is provided in which users are proactively notified upon the occurrence of certain file system events. Because they are proactively notified, they need not incur the overhead of repeated polling to detect conditions that indicate that the events of interest have occurred. The ability to be notified upon the occurrence of a file system event is extremely useful, for example, when particular file system events have significant meaning to a user.

For example, it is common for multiple copies of a document to be maintained at different locations ("cached") to provide more efficient access to the document. Under these conditions, if one of the copies is updated, the remaining copies are rendered stale (i.e. they no longer reflect the current state of the document). Using the event notification techniques described hereafter, when one copy is updated, the sites at which the other copies reside can be proactively notified of the update. Processes or users at those sites may then take whatever action is appropriate under the circumstances. In the case of a cache, the appropriate action may be, for example, to replace the cached version of the document with the updated version.

As another example, a particular user may be responsible for reviewing all of the technical documents of a company before they are published. The technical writers of that company may be instructed to store all technical documents into a "ready for review" directory when they are ready for review by that user. Without a proactive notification system, the mere storage of a technical document into the "ready for review" directory does not make the user aware that a new document is ready for review. Rather, some additional work would be required, such as the technical writer informing the user that the document is ready for review, or the user periodically checking the "ready for review" directory. In contrast, with a file system that implements the event notification techniques described herein, the act of placing a technical document into the "ready for review" directory could trigger the generation of a message to the user to notify the user that a new technical document is ready for review.

According to one embodiment of the invention, rules may be defined for proactively generating messages for file system events. Such events include, for example, storage or creation of files in a particular directory, deletions of files in a particular directory, movement of files out of a particular directory, modification or deletion of a particular file, and linking a file to a particular directory. These file system operations are merely representative. The specific operations for which proactive notification rules may be created may vary from implementation to implementation. The present invention is not limited to providing event notification support for any particular set of file system operations.

According to one embodiment, event_ids are assigned to file system events. Notification rules may then be created which specify an event_id and a set of one or more subscribers. Once a rule has been registered with the file system, the set of consumers identified in the rule are automatically sent messages in response to the occurrence of the file system event identified by the event_id of the rule.

For example, a user may register an interest in knowing when files are added to a particular directory. To record this interest, the database server (1) inserts an row into a "registered rules" table, and (2) sets a flag associated with the directory to indicate that at least one rule has been registered for the directory. The row inserted into the registered rules table identifies the entity and indicates the event in which the entity is interested. The row may also include additional information, such as the protocol to use to communicate with the entity. The flag that indicates that a rule applies to the directory may be stored in the files table row associated with the directory, in the hierarchical index entry associated with the directory, or both.

When inserting a file into a directory, the database server inspects the flag associated with the directory to determine whether any rules have been registered for that directory. If a rule has been registered for that directory, then the registered rules table is searched to find the specific rules that apply to the directory. If the registered rules include rules that apply to the specific operation that is being performed on the directory, then messages are sent to the interested entities identified in those rules. The protocol used to send the messages to the entities may vary from entity to entity. For example, for some entities the message may be sent via CORBA, while for other entities the message may be sent in the form of an HTML page via HTTP.

According to one embodiment, the notification mechanism is implemented in conjunction with a database-implemented file system, as described above, using a queuing mechanism such as the queuing mechanism described in U.S. patent application Ser. No. 08/961,597, entitled APPARATUS AND METHOD FOR MESSAGE QUEUING IN A DATABASE SYSTEM, filed by Chandra et. al. on Oct. 31, 1997, the entire contents of which are incorporated herein by reference.

According to one such embodiment, an event server executing external to a database server is registered as a subscriber to a queue managed by the database server. The queue to which the event server subscribes shall be referred to herein as the file event queue. Entities that are interested in particular file system events register their interest with the event server. The event server communicates with the database server through the database API, and with the interested entities through the protocols supported by those entities.

When the database server performs an operation related to the file system, the database server places into the file event queue a message that indicates the event_id associated with the operation. The queuing mechanism determines that the event server has registered an interest in the file event queue, and transmits the message to the event server. The event server searches a list of interested entities to determine whether any entity has registered an interest in the event identified in the message. The event server then transmits a message that indicates the occurrence of the file system event to all entities that have registered an interest in the event.

In an embodiment that uses event servers to forward messages to interested entities, the event servers may be configured to support a certain maximum number of users. If the number of interested users exceeds the maximum, then additional event servers are initiated to service the additional users. Similar to the single event server scenario, each event server in a multiple event server system is registered as a subscriber to the file event queue.

According to an alternative embodiment, the entities that are interested in file system events are directly registered as subscribers to the file event queue. As part of the registration information, the entities indicate the event_ids of the file system events in which they are interested. When the queuing mechanism places a message in the file event queue, the queuing mechanism does not automatically send the message to all queue subscribers. Rather, the queuing mechanism inspects the registration information to determine which entities have registered an interest in the specific event associated with the message, and selectively sends the message to only those entities. In the case of entities that do not support the database API, the registration information includes information about the protocol supported by those entities. The queuing mechanism transmits the file event messages to those entities using the protocols listed in their registration information.

File system event notification may be applied in a variety of contexts. For example, at times it is desirable to store on a first machine a cache of files that reside on a second machine. One currently available mechanism to implement such a file cache is the "briefcase" feature provided by Microsoft Windows operating systems. The briefcase feature allows users to create a special folder (a "briefcase") on one machine, and copy into that briefcase files that are stored on other machines. Each briefcase has an "update" option which, when selected, causes the file system to compare the copy of the file that is in the briefcase with the copy of the file that is in the original location. If the files do not have the same modification date, then the file system allows the user to synchronize the two copies (typically by copying the newer copy over the older copy).

Unlike the briefcase mechanism, the file system event notification mechanism allows a file cache to be proactively updated so that it always reflects the current state of the files at their original locations. For example, the process that manages the file cache may register an interest in updates to the original copies of the files contained in the cache. Consequently, the process will automatically be informed when any of the original files are updated, and may immediately respond by copying the updated files into the file cache. Similarly, the file system event notification mechanism may be used to mirror on a first machine one or more directories that reside on a second machine. To use the file system event notification mechanism in this manner, a process for maintaining the mirrored directories initially makes copies of the directories and all of the files contained therein, and then registers its interest in changes made to the directories and the files contained in the directories. When informed that a change has been made to a directory, the process makes a corresponding change to the copy of the directory. Similarly, when informed of a change to any of the files within the mirrored directories, the process makes a corresponding change to the copy of the file.

For example, if a file moved from a directory that is mirrored to a directory that is not mirrored, the process deletes the copy of the file from the mirrored directory, and unregisters its interest in the file. Thus, the process will not continue to be notified when the file is updated. Similarly, if a file is moved from a directory that is not mirrored to a directory that is mirrored, the process will be informed that the directory has changed. In response to that message, the process identifies the new file, makes a copy of the new file in the mirrored directory, and registers its interest in the new file.

Version Management in the File System

In the workplace, large assignments that involve many people working together for extended periods of time are referred to as "projects". While working on a project, workers typically generate numerous documents, each of which is in some way related to the project.

Similarly, within a computer system, users frequently create numerous electronic documents that all relate to a project. For example, programmers located at numerous sites around the world may each be working on different portions of the same computer program. The electronic documents that they generate for that computer program, which typically would include source code files, belong to a single project. Thus, within the context of this discussion, projects are collections of related files.

Figure 13:
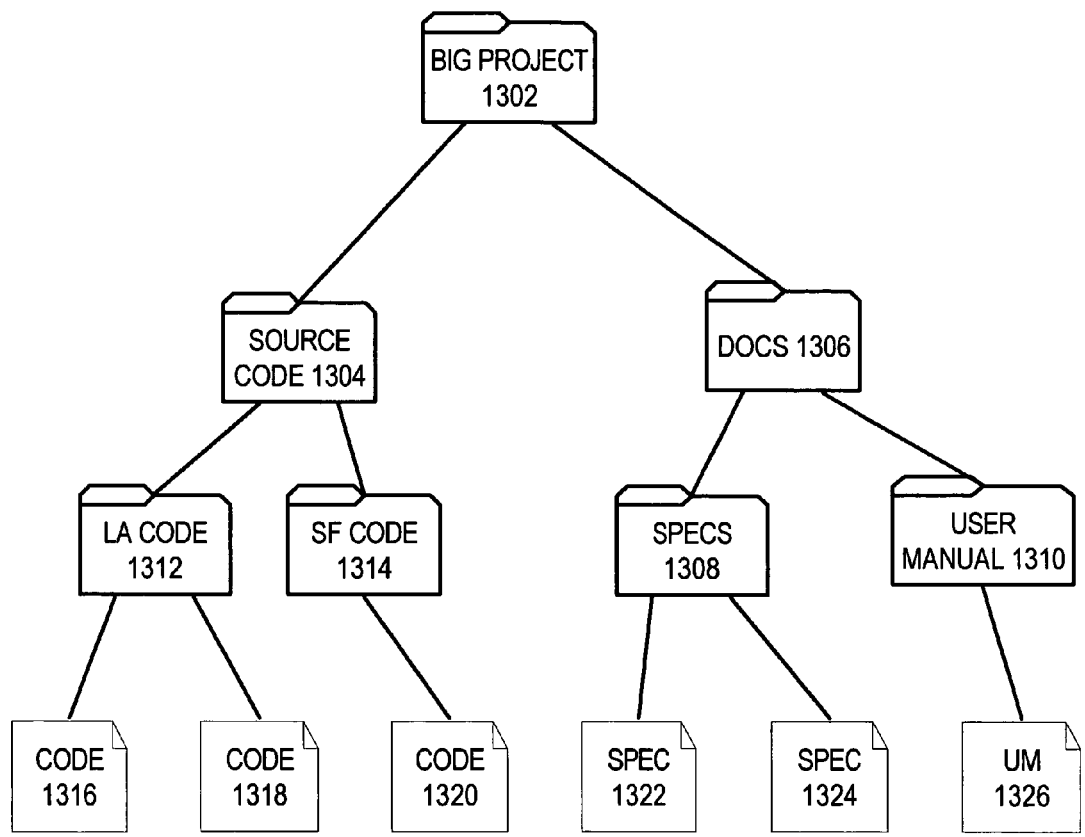
FIG. 13 is a block diagram that illustrates a file hierarchy

Typically, the files of a project will be organized into specific folders. For example, FIG. 13 shows an example of how files related to a project "Big Project" may be organized into various folders. Referring to FIG. 13, a folder entitled Big Project 1302 has been created to hold all files (directories and documents) related to the project. The immediate child files of Big Project 1302 are the folders source code 1304 and docs 1306. Source code 1304 includes two directories, LA code 1312 for storing the source code 1316 and 1318 of programmers located in Los Angeles, and SF code 1314 for storing source code 1320 of programmers located in San Francisco. Docs 1306 includes two folders: specs 1308 and user manual 1310. Specs 1308 includes spec 1322 and 1324. User manual 1310 includes UM 1326.

Frequently, files within a project will contain references (e.g. HTML links) to other files within the same project. These references typically identify the other document using the full pathname of the document. Consequently, if a document is moved from one location in the directory hierarchy to another, or the name of the document is changed, then all references to that document are rendered invalid.

Due to the existence of inter-document references, new versions of files are typically stored with the same name and in the same location as the older versions that they are replacing. In conventional file systems, this process overwrites the older version of the file, making it irrecoverable. Unfortunately, there are many circumstances in which it is desirable to recover older versions of files. For example, critical information may have been inadvertently deleted from the newer version. If the older version is irrecoverable, then the user may have to spend significant resources to recreate the lost material, if it can be recreated at all. In addition, it is often desirable to be able to reconstruct the change history for a file, to be able to determine when a particular change was made, or to be able to determine what was changed at a given point in time.

According to one aspect of the invention, a versioning mechanism is provided in which new versions of files are saved in the same location in the directory hierarchy using the same name as the older versions without overwriting the older versions. Rather than overwrite the older versions, the older versions are retained, and users can selectively retrieve older versions of files. Further, the older versions are retained at their original locations in the directory hierarchy. As shall be described in greater detail hereafter, novel directory versioning techniques are provided that allow the file system to retain, at the same location within a directory hierarchy, multiple versions of the same file with the same name.

Because the creation of new versions does not change the name or location of the original versions, any references to a first version of a file continue to point to the first version of the file even when a newer version of the file is created. Thus, inter-file references contained within a document continue to point to the correct versions of the referenced documents, even if newer versions of the referenced documents have been created. The fact that inter-file references remain valid (i.e. continue to refer to the correct version of the referenced files) during the versioning process has a significant beneficial impact on the efficiency of file retrieval. Specifically, rather than necessitating the performance of a look-up operation to find the appropriate version of a referenced file, referenced files may be retrieved directly by following references to them contained within other files.

Similarly, the process of determining the contents of a directory at a particular point in time need not involve look-up operations. Since directories are themselves versioned, selection of a particular version of a directory implicitly selects the members of the directory. The selected version of a directory will contain direct links to the correct files, and the correct version of the files, that belong to that version of the directory.

Techniques are also provided for tracking the relationship between versions of the same file even when the name of the file changes from version to version. As shall be described in greater detail hereafter, a FileID and version number are maintained for each version of each file, in addition to the file's name. If two files have the same FileID, they are different versions of the same file even though they may have different names.

According to one aspect of the invention, a mechanism is provided to allow users to select the "view" of a project that they want to see. A view of a project presents the files of the project as they existed at a particular point in time. For example, the default view presented to users may present the most current version of all files. Another view may present the version of the files that was current as of one day earlier. Another view may present the version of the files that was current as of one week earlier.

According to one embodiment, a version tracking mechanism is provided by storing a version number with a each file in a project. For example, in a file system implemented in a database system using a files table, such as files table 710, one column of the row associated with a file may store a version number for the file. Whenever a file is created, a row for the file is inserted into the files table 710, and a predetermined initial version number (e.g. 1) is stored in the version column of that row.

When the file is updated, the previous version of the file is not overwritten. Rather, a new row is inserted in the files table for the new version of the file. The row for the new version contains the same FileId, Name, and Creation Date as the original row, but includes a higher version number (e.g. 2), a new Modification Date, and possibly a different file size, etc. In addition, the BLOB that stores the content of the file will reflect the update, while the BLOB of the original entry remains unchanged.

According to one embodiment, when a file and the directory in which the file resides both belong to a project, then a change to the file effectively creates a new version of the directory. Consequently, a update to a file in a directory will not only cause the creation of a files table row for the new version of the file, but will cause the creation of a files table row for the new version of the directory. In an embodiment that uses a hierarchical index, an index entry for the new version of the directory would also be added to the hierarchical index.

If both a directory and the parent directory belong to the same project, then the creation of a new version of the directory effectively creates a new version of the parent directory. Consequently, new rows are also added to the files table and hierarchical index for the parent directory of the directory. This process continues, causing new versions to be created for all directories that belong to a project and that reside above an updated file in the file hierarchy.

Figure 14:
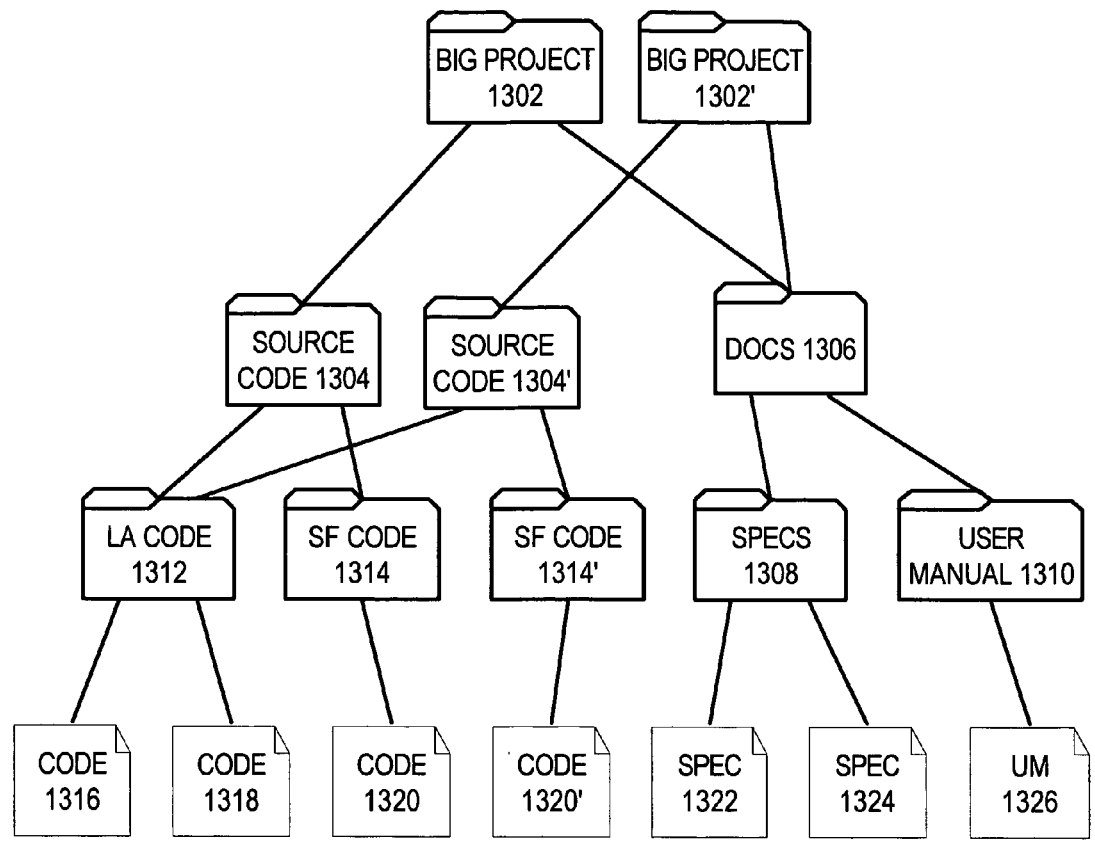
FIG. 14 is a block diagram that illustrates how the file hierarchy of FIG. 13 is updated in response to an update to a document according to one embodiment of the versioning techniques described herein.

To illustrate how the versioning mechanism responds to an update of a file that belongs to a project, assume that all files shown in FIG. 13 are version 1, and that an update is performed to code 1320. As illustrated in FIG. 14, the versioning mechanism responds to the update by creating a new version of code 1320' without deleting the original version of the code 1320. Code 1320 belongs to SF code directory 1314, so a new version of SF code directory 1314' is created without deleting the original version. SF code directory 1314 belongs to source code directory 1304, so a new version of source code directory 1304' is created without deleting the original version. Finally, source code directory 1304 belongs to big project directory 1302, so a new version of big project 1302' is created without deleting the original version.

As illustrated in FIG. 14, when a new version of a parent file is created in response to a new version of a child file, the new version of the parent file continues to have the same children as it had before the update, with the exception that the new version of the updated file is its child, rather than the original version of the updated file. For example, the new version of code 1320' is the child of the new version of SF code 1314'. The new version of SF code 1314' is a child of the new version of source code 1304'. However, the unchanged child files of the original source code 1304 (e.g. LA code 1312) continue to be child files of the new version of source code 1304'. Similarly, the new version of source code 1304' is the child of the new version of big project 1302', but the unchanged child files of the original big project (e.g. docs 1306) continue to be child files of the new version of big project 1302.

In an embodiment in which the file system is implemented using a hierarchical index, the index entry created for a new version of a directory would contain the same Dir_entry_list as the index entry for the previous version of the directory, except that the array entry for the child file that was updated is replaced with an array entry to the new version of the child file. If the updated child file was a child directory, then the Dir_entry_list array entry for the new directory would include the RowID, within the hierarchical index, of the index entry for the new version of the child directory.

Figure 15:
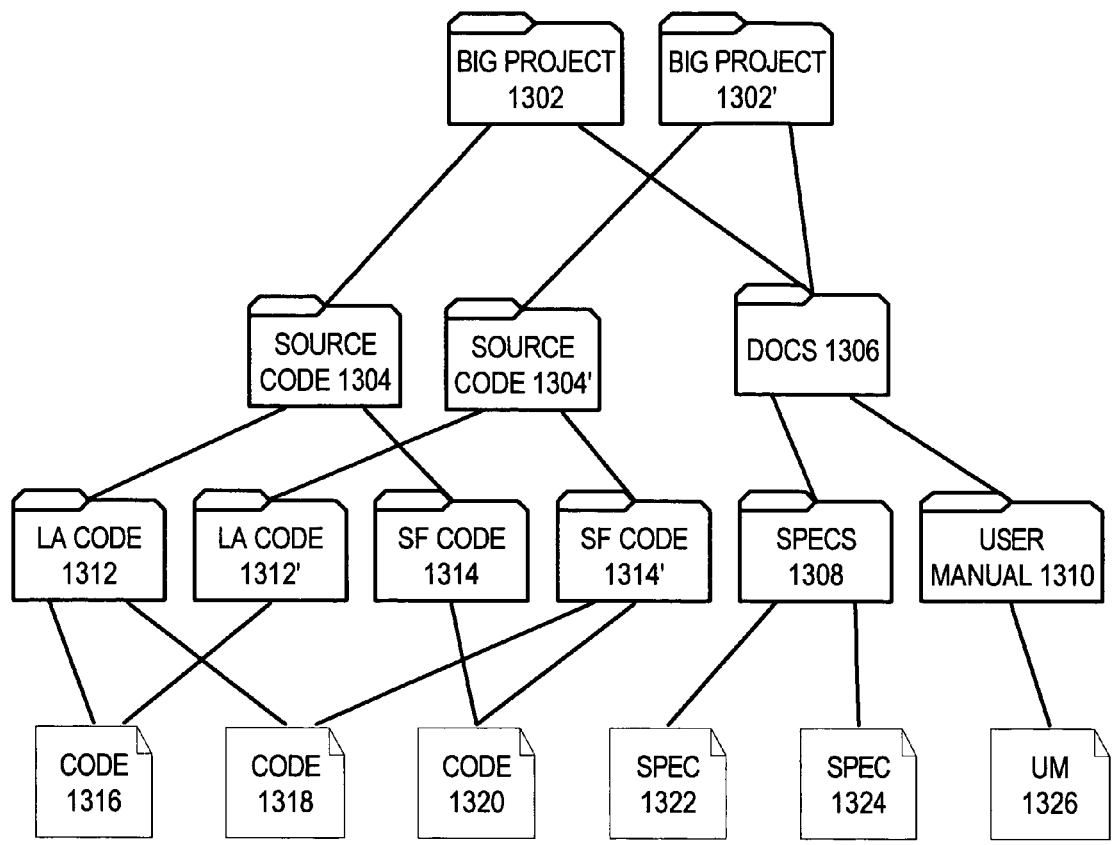
FIG. 15 is a block diagram that illustrates how the file hierarchy of FIG. 13 is updated in response to the movement of a document from one folder to another according to one embodiment of the versioning techniques described herein.

When a file that belongs to a project is moved from one directory in the project to another directory in the project, the file itself has not been changed, so a new version of the file is not created. However, the directory from which the file was moved, and the directory into which the file was placed, have both been changed. Consequently, new versions are created for those directories and all ancestor directories of those directories that are in the same project. FIG. 15 illustrates the new directories that would be created in response to code 1318 of FIG. 13 being moved from LA code 1312 to SF code 1314. Specifically, new versions of LA code 1312' and SF code 1314' would be created. The new version of LA code 1312' would not have code 1318 as its child. Rather, code 1318 would be the child of the new version of SF code 1314'. A new source code directory 1304' is created and linked to the new versions of LA code 1312' and SF code 1314'. A new big project directory 1302' is created and linked to the new source code directory 1304', and to the original docs directory 1306.

Using the versioning technique described above, a new version of the root directory of a project (e.g. big project 1302) is created after every change to the project. The links that descend from each version of the root project directory link together all files that belonged to the project at a particular point in time, and the versions of the files thus linked are the versions that existed at that particular point in time. For example, referring to FIG. 14, the links descending from big project 1302 reflect the project as it existed prior to the update to code 1320. The links descending from big project 1302' reflect the project as it existed immediately after the update to code 1320. Similarly, in FIG. 15, the links descending from big project 1302 reflect the project as it existed prior to moving code 1318 from LA code 1312 to SF code 1314. The links descending from big project 1302' reflect the project as it existed immediately after moving code 1318 from LA code 1312 to SF code 1314.

Tagging

Unfortunately, the versioning technique described above causes a significant proliferation of file versions, particularly of the directories that are at higher levels of a project. Under some conditions, this proliferation may be both unnecessary and undesirable. Therefore, according to one embodiment of the invention, a mechanism is provided for "tagging" versions of files. Tagging a version of a file indicates that that version of the file should be retained. Thus, rather than always retaining older version of files when newer versions are created, older versions of files are retained only if they have been tagged. Otherwise, they are replaced (overwritten) when newer versions are created.

Referring to FIG. 13, assume that code 1320 has not been tagged. If code 1320 is updated, the new version of the code merely replaces the old version of the code. Only if code 1320 has been tagged are separate new versions made of code 1320, SF code 1314, source code 1304 and big project 1302, as illustrated in FIG. 14.

Under many circumstances, tags will be applied to all files within a project at the same time. For example, if a particular version of a software program is released, all of the source code used to create the released version of the program may be tagged at that point in time. Consequently, the exact set of source code associated with the released version will be available for later reference regardless of subsequent revisions to the source code files.

In an embodiment where tags are always applied to a project as a whole, a single tag may be maintained for the root project directory. If a file is located using a version of the root project directory that is tagged, then any change to that file will cause a new version of the file to be created while the original version of the file is retained. If, on the other hand, a file is located using a version of the root project directory that is not tagged, then any change to that file will merely overwrite the previous version of the file.

According to another embodiment, applying a tag to a file effectively applies a tag to all files that reside below that file in the file hierarchy. For example, assume that a tag is applied to LA code 1312. If code 1318 is moved out of LA code 1312, then a new version of LA code 1312 is created. If code 1318 is updated, then new versions of both code 1318 and LA code 1312 are created. In such an embodiment, if a file is located by traversing the file hierarchy through any tagged file, then any change to that file causes a new version of the file to be created. If a file is located without traversing any file in the hierarchy that is tagged, then any change to that file overwrites the previous version of the file.

Purge Count

Another technique for reducing the proliferation of versions, which may be employed instead of or in addition to tagging, involves maintaining a purge count. A purge count indicates the maximum number of versions that will be retained for any given file. If a new version is created for a file which is already at the purge count number of versions, the new version of that file overwrites the oldest retained version of that file. A purge count may be implemented on a per-file system, per-project, or per-file basis. When implemented on a per-file system basis, a single purge count applies to all files maintained in the file system. On a per-project basis, all files in a given project have the same purge count, but different projects may have different purge counts. On a per-file basis, a different purge count may be specified for each file.

When used in combination with tagging, the purge count mechanism may be implemented in a variety of ways. According to one embodiment, tagged files are ignored for the purpose of determining whether creating a new version of a file would exceed the purge count, and tagged files are never deleted by the purge count mechanism. For example, assume that the purge count for a file is five, that five versions of the file exist, and that one of those five versions is tagged. When an update is made to the file, the purge count mechanism determines that there are currently only four existing non-tagged versions of the file, and therefore creates another version of the file without deleting any of the existing versions. If the same file is updated again, then the purge count mechanism determines that there are five existing non-tagged versions of the file, and therefore deletes the oldest non-tagged version of the file in response to creating a new version.

Inter-Project Links

Each link has a source file (the file from which the link extends) and a target file (the file to which the link points). In the file hierarchy, the source file of a link is frequently a directory, while the target file of the link is a file within the directory. However, not all links are between directories and their children. For example, an HTML file may include hyperlinks to graphic images and to other HTML files. In a file system implemented using a hierarchical index, those hyperlinks may be handled in the same manner as directory-to-document links.

A view of the file system shows how each project in the file system existed at a particular point in time. However, the point in time associated with one project in a view may be different than the point in time associated with another project in the same view. This creates a problem when the source file of a link belongs to a different project than the target file of the link. For example, assume that a view specifies a time T1 for a project P1 that includes a file F1, and a later time T2 for a project P2 that includes a file F2. Assume further that file F2 has a link to file F1. The link contained in the T2 version of F2 will go to the T2 version of P1, not the T1 version of P1. However, because the view specifies T1 for P1, the T1 version of P1 should be used for any operations performed on any files in P1 through the view.

According to one embodiment of the invention, an "inter-project boundary" flag is maintained for each link. The inter-project boundary flag of a link indicates whether the source file and the target file of the link are in the same project. In a file system that uses a hierarchical index, such as hierarchical index 510, an inter-project boundary flag may be stored, for example, in each array entry of an index entry's Dir_entry_list.

During the traversal of the file hierarchy, the inter-project boundary flag of every link is inspected before the link is followed. If the inter-project boundary flag of a link is set, then the required version time of the project to which the source side file belongs is compared to the required version time of the project to which the target side file belongs. If the desired version time is the same, then the link is traversed. If the desired version time is not the same, then a search is performed for the version of the target file that corresponds to the required version time of the project to which the target side file belongs.

For example, the inter-project boundary flag of the link between F2 and F1 would be set. Consequently, a comparison is made between the required version time of P2 and the required version time of P1. The required version time of P2 is T2, which is not the same as T1, the required version time of P1. Therefore, P1 would not be located by following the link. Rather, a search would be performed to locate the version of P1 that corresponds to time T1.

According to an alternative embodiment, no inter-project boundary flags are maintained. Instead, ever time a link is encountered, the required version time of the source file is compared to the required version time of the target file. If the source and target files are in the same project, or if they are in different projects that have the same required version times, then the link is followed. Otherwise, a search is performed to find the correct version of the target file.

Object-Oriented File System

In recent years, object oriented programming has become the standard programming paradigm. In object oriented programming, the world is modeled in terms of objects. An object is a record combined with the procedures and functions that manipulate it. All objects in an object class have the same fields ("attributes"), and are manipulated by the same procedures and functions ("methods"). An object is said to be an "instance" of the object class to which it belongs.

Sometimes an application requires the use of object classes that are similar, but not identical. For example, the object classes used to model both dolphins and dogs might include the attributes of nose, mouth, length and age. However, the dog object class may require a hair color attribute, while the dolphin object class requires a fin size attribute.

To facilitate programming in situations in which an application requires multiple similar attributes, object oriented programming supports "inheritance". Without inheritance, a programmer would have to write one set of code for the dog object class, and a second set of code for the dolphin object class. The code implementing the attributes and methods common to both object classes would appear redundantly in both object classes. Duplicating code in this manner is very inefficient, especially when the number of common attributes and methods is much greater than the number of unique attributes. Further, code duplication between object classes complicates the process of revising the code, since changes to a common attribute will have to be duplicated at multiple places in the code in order to maintain consistency between all object classes that have the attribute.

Inheritance allows a hierarchy to be established between object classes. The attributes and methods of a given object class automatically become attributes and methods of the object classes that are based upon the given object class in the hierarchy. For example, an "animal" object class may be defined to have nose, mouth, length and age attributes, with associated methods. To add these attributes and methods to the dolphin and dog object classes, a programmer can specify that the dolphin and dog object classes "inherit" the animal object class. Under these circumstances, the dolphin and dog object classes are said to be "subclasses" of the animal object class, and the animal object class is said to be the "parent" class of the dog and dolphin object classes.

According to one aspect of the invention, a mechanism is provided for applying the object-oriented paradigm, including inheritance, to a file system. Specifically, each file in the file system belongs to a class. The class of a file system determines, among other things, the type of information that the file system stores about the file. According to one embodiment, a base class is provided. Users of the file system may then register other classes, which may be defined as subclasses of the base class or any previously registered class.

When new file classes are registered with the file system, the file system is effectively extended to support new types of files, and interaction with new types of file systems. For example, most e-mail applications expect e-mail documents to have a "priority" property. If a file system does not provide storage for the priority property, then the e-mail applications may not operate properly with e-mail documents stored in that file system. Similarly, certain operating systems may expect certain types of system information to be stored with a file. If the file system does not store that information, the operating systems may encounter problems. By registering a class that includes all of the attributes required to support a particular type of system or protocol (e.g. specific operating systems, FTP, HTTP, IMAP4, etc) accurate and transparent interaction with that system or protocol becomes possible.

To register a class, information is provided about the class, including data that identifies the parent class of the class and describes any attributes that the class has that the parent class does not have. The information may also specify specific methods that operate on instances of the class.

An object-oriented file system that allows users to register file classes, supports inheritance between file classes, and stores information about the files based on the class to which they belong may be implemented in a variety of ways depending on the context in which the file system itself is implemented. According to one embodiment, an object-oriented file system is provided in the context of a database-implemented file system, as described above. However, while various aspects of the object-oriented file system shall be described relative to a database-implemented embodiment, the object oriented file system techniques described herein are not limited to such an embodiment.

Database-Implementation of Object Oriented File System

Figure 16:
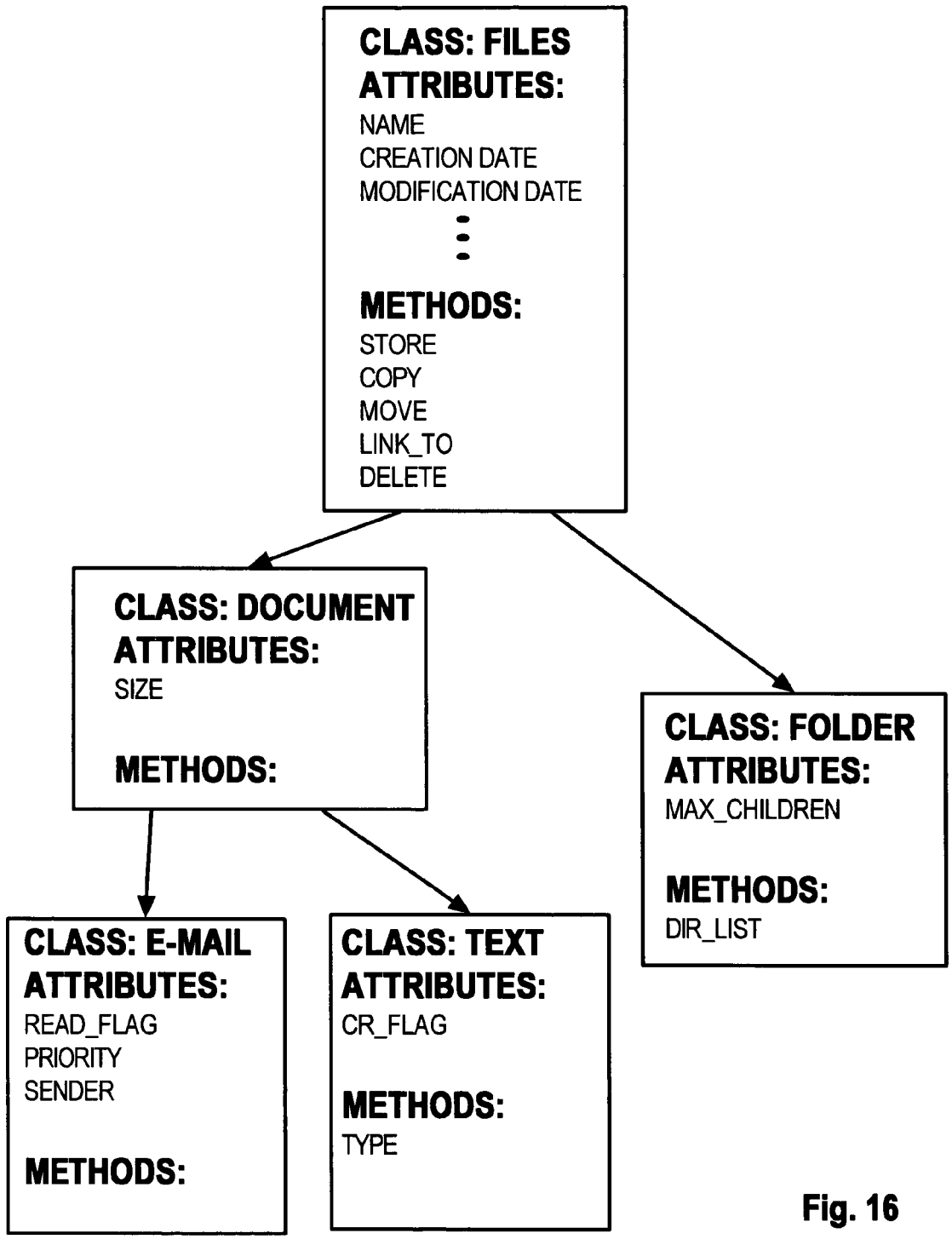
FIG. 16 is a block diagram illustrating a class hierarchy of file classes according to an embodiment of the invention.

According to one embodiment, a database-implemented file system provides a base class, and allows subclasses of the base class to be registered with the file system. Referring to FIG. 16, it illustrates an exemplary set of file classes. The base class is entitled "Files" and includes attributes that are generally common to all files, including name, creation date, and modification date. Similarly, the methods of the Files class include methods for operations that may be performed on all files.

According to one embodiment, the attributes of the Files class is the union of all attributes maintained by the operating systems with which the database-implemented file system will be used. For example, assume that the file system is implemented in a database managed by server 204 as shown in FIG. 3. The files stored in the file system originate from operating systems 304*a* and 304*b*, which do not necessarily support the same set of file attributes. Consequently, the set of attributes of the Files class of the file system implemented by database server 204 would be the union of the sets of attributes supported by the two operating systems 304*a* and 304*b*.

According to an alternative embodiment, the attributes of the Files class is the intersection of all attributes maintained by the operating systems with which the database-implemented file system is used. In such an embodiment, a subclass of the Files class could be registered for each operating system. The subclass registered for a given operating system would extend the base Files class by adding all of the attributes supported by that given operating system that are not already included in the base Files class.

In the embodiment illustrated in FIG. 16, two subclasses of the Files class have been registered: a "Document" class and a "Folder" class. The Document class inherits all of the attributes and methods of the Files class, and adds attributes that are specific to document files. In the illustrated embodiment, the Document class adds the attribute "size".

The Folder class inherits all of the attributes and methods of the Files class and adds attributes and methods that are specific to folder files (i.e. files, such as directories, that are able to contain other files). In the illustrated embodiment, the Folder class introduces a new attribute "max_children" and a new method "dir_list". The max_children attribute may, for example, indicate the maximum number of child files that may be contained in a given folder. The "dir_list" method may, for example, provide a listing of all of the child files of a given folder.

In the class hierarchy illustrated in FIG. 16, the Document class has two registered subclasses: e-mail and Text. Both subclasses inherit all of the attributes and methods of the Document class. In addition, the e-mail class includes three additional properties: read_flag, priority, and sender. The Text class has one additional attribute, CR_Flag, and an additional method, Type. The CR_Flag may be a flag to indicate whether the text document contains "carriage return" symbols. The Type method outputs the text document to an I/O device, such as a computer monitor.

File Class and File Format

The internal structure of a file is referred to as the "format" of the file. Typically, the format of a file is dictated by the application that creates the file. For example, a document created by one word processor may have the same semantic content but an entirely different format than another document created by a different word processor. In some file systems, a mapping is maintained between document formats and filename extensions. For example, all files that have filenames ending in .doc are presumed to be files created by a particular word processor, and therefore are presumed to have the internal structure imposed by that word processor. In other file systems, information about the format of document is maintained in a separate metafile associated with the document.

In contrast to file formats, the file class mechanism described herein does not relate to the internal structure of a document. Rather, the file class of a file dictates what information the file system maintains for the file, and what operations the file system can perform on the file. For example, documents created by numerous word processors may all be instances of the Document class. Consequently, the file system would maintain the same attribute information about the documents, and allow the same operations to be performed on the documents, even though the internal structures of the documents are completely different.

Class Tables

According to one embodiment, an object-oriented file system is implemented in a relational database system where a relational table is created for each class of file. FIG. 17 is an example of the tables that may be created for the classes illustrated in FIG. 16. Specifically, Files table 1702, Document table 1704, E-mail table 1706, Text table 1708 and Folder table 1708 respectively corresponds to the Files class, Document class, E-mail class, Text class and Folder class.

According to one embodiment, the class table for a given class includes rows for (1) files that belong to that given class, and (2) files that belong any descendant class of that given class. For example, in the illustrated system, the Files class is the base class. Consequently, every file in the file system will be a member of the Files class or a descendant class thereof. Therefore, the Files table will include rows for all files in the file system. On the other hand, the E-mail class and the Text class are descendents of the Document class, but the Files class and the Folder class are not. Therefore, the Document table 1704 includes rows for all files of class Document, E-mail or Text, but not for files that are of class Files or Folder.

The table for each class includes columns to store values for the attributes that are introduced by that class. For example, the Document class inherits the attributes of the Files class, and adds to those attributes the size attribute. Therefore, the Document table includes a column for storing a size value for the size attribute. Similarly, the E-mail class inherits the attributes of the Document class and introduces the read_flag, priority, and sender attributes. Consequently, the E-mail table 1706 includes columns for storing read_flag values, priority values, and sender values.

Five files are stored in the file system illustrated in FIG. 17. The file named File1 is stored at RowID X1 in Files table 1702. The FileID of File1 is F1. The class of File1 is the File class, as indicated by the value stored in the Class column of row X1. Because File1 is an instance of the Files class, the Files table 1704 is the only class table that contains information for File1. Thus, the only attribute values stored for File1 are values for the attributes associated with the Files class.

The file named File2 is stored at RowID X2 in Files table 1702. The FileID of File2 is F2. The class of File2 is the Document class, as indicated by the value stored in the Class column of row X2. Because File2 is an instance of the Document class, the Files table 1702 and Document table 1704 contain information for File2. Thus, the attribute values stored for File2 are values for the attributes associated with the Documents class, including those attributes inherited from the Files class.

The file named File3 is stored at RowID X3 in Files table 1702. The FileID of File3 is F3. The class of File3 is the E-mail class, as indicated by the value stored in the Class column of row X3. Because File3 is an instance of the E-mail class, the Files table 1702, the Document table 1704 and the E-mail table 1706 all contains information for File3. Thus, the attribute values stored for File3 are values for the attributes associated with the E-mail class, including those attributes inherited from the Document and Files classes.

The file named File4 is stored at RowID X4 in Files table 1702. The FileID of File4 is F4. The class of File4 is the Text class, as indicated by the value stored in the Class column of row X4. Because File4 is an instance of the Text class, the Files table 1702, the Document table 1704 and the Text table 1708 contain information for File4. Thus, the attribute values stored for File4 are values for the attributes associated with the Text class, including those attributes inherited from the Document and Files classes.

The file named File5 is stored at RowID X5 in Files table 1702. The FileID of File5 is F5. The class of File5 is the Folder class, as indicated by the value stored in the Class column of row X5. Because File5 is an instance of the Folder class, the Files table 1702 and the Folder table 1708 contain information for File5. Thus, the attribute values stored for File5 are values for the attributes associated with the Folder class, including those attributes inherited from the Files class.

According to one embodiment of the invention, the files within the class tables are accessed by traversing a hierarchical index, as described above with reference to FIGS. 5 and 8. A traversal of the hierarchical index (as is performed during pathname resolution) produces the RowID of the row within Files table 1702 that corresponds to a target file. From that row, attribute values for the Files class attributes may be retrieved. However, for files that belong to other classes, additional attributes may have to be retrieved from other class tables. For example, for File3 the creation and modification dates may be retrieved from row X3 of Files table 1702. However, to retrieve the size of File3, row Y2 of Document table 1704 must be accessed. To retrieve the priority information for File3, row Q1 of E-mail table 1706 must be accessed.

To facilitate the retrieval of the various attribute values that belong to a file, the rows containing those attributes are linked to each other. In the illustrated embodiment, the links are stored in columns labeled "Derived RowID". The value stored in the Derived RowID column of a row for a particular file in a table for a particular class points to the row for that particular file that resides in a table for a subclass of that particular class. For example, the Derived RowID column of the Files table row X3 for File3 contains the value Y2. Y2 is the RowID of the row for File3 in the Document table 1704. Similarly, the Derived RowID column of the Document row Y2 contains the value Q1. Q1 is the RowID of the row for File3 in the E-mail table 1706.

In the illustrated embodiment, the links between the rows for a particular file are unidirectional, going from the row in the table for a parent class to the row in the table of a subclass. These unidirectional links facilitate searches that start with rows in the base table (i.e. the files table), which under most conditions will be the case. However, if the starting point of a search is the row of another table, the related rows in the parent class tables cannot be located by the links. To find those related rows, a search of those tables may be performed based on the FileID of the file of interest.

For example, assume that a user has retrieved row Y2 of Document table 1704, and desires to retrieve all of the other attribute values for File3. The row containing the E-mail-specific attribute values may be found by following the pointer in the Derived RowID column of row Y2, which points to row Q1 in E-mail table 1706. However, to find the remaining attributes, the Files table 1702 is searched based on the FileID F3. Such a search would find row X3, which contains the remaining attribute values of File3.

According to an alternative embodiment, the links between related rows may be implemented in a way that allows all related rows to be located without a FileID lookup. For example, each class table may also have a Parent RowID column that contains the RowID of the related row in a parent class table. Thus, the Parent RowID column for row Y2 of Document table 1704 would point to row X3 in the Files table 1702. Alternatively, the last row in the chain of unidirectional links may include a pointer back to the related row in the Files table. Yet another alternative involves establishing, for each class table, a column that includes a pointer back to the related row in the Files table. Thus, row R1 of Text table 1708 and row Y3 of Document table 1704 would both include pointers back to row X4 of Files table 1702.

Subclass Registration

As mentioned above, a mechanism is provided for extending the class hierarchy of the file system by registering new classes. In general, the information provided during the class registration process includes data that identifies the parent class of the new class, and data that describes attributes that are added by the new class. Optionally, the data may also include data used to identify new methods that can be performed on instances of the new class.

The registration information may be provided to the file system using any one of numerous techniques. For example, a user may be presented with a graphical user interface that includes icons representing all of the registered classes, and the user may operate controls presented by the user interface to (1) select one of the classes as the parent of a new class, (2) name the new class, (3) define additional attributes for the new class, and (4) define new methods that may be performed on the new class. Alternatively, a user may provide to the file system a file containing the registration information for a new class. The file system parses the file to identify and extract the information, and builds a class file for the new class based on the information.

According to one embodiment of the invention, the class registration information is provided to the file system in the form of an Extensible Markup Language (XML) file. The XML format is described in detail at www.oasis-open.org/cover/xml.html#contents and at the sites listed there. In general, the XML language includes tags that name fields and mark the beginnings and ends of fields, and values for those fields. For example, an XML document containing registration information for the "Folder" file class may contain the following information:

<typename>
folder
</typename>
<inherits_from>
files
</inherits_from>
<dbi_classname>
my_folder_methods
</dbi_classname>
<prop_def>
<name>
max_children
</name>
<type>
integer
</type>
</prop_def>

In response to receiving this file class registration document, the file system creates a table for the new class Folder. The new table thus created includes a column for each of the attributes defined in the registration information. In the present example, only the max_children attribute is defined. The data type specified for the max_children attribute is "integer". Consequently, the Folder table is created with a max_children column that holds integer values. In addition to the name and type of an attribute, various other information may be provided for each attribute. For example, the registration information may indicate a range or maximum length for attribute values, and whether the column should be indexed or subject to a uniqueness or referential constraint.

The registration information also includes information about any methods supported by the new file class. According to one embodiment, the new methods are specified by identifying a file that contains the routines associated with those methods. According to one embodiment, the routines associated with each file class are implemented in a JAVA class. If a first file class is a subclass of a second file class, then the JAVA class that implements the methods associated with the first file class is a subclass of the JAVA class that implements the methods of the second file class.

In the XML example given above, the dbi_classname field of the registration information specifies a JAVA class file for the Folder file class. Specifically, the registration information provides the filename "my_folder_methods" for the dbi_classname field to indicate that the my_folder_methods JAVA class implements the routines for the non-inherited methods of the Folder class. Because the Folder class is a subclass of the Files class, the my_folder_methods class would be a subclass of the JAVA class that implements the methods for the Files class. Thus, the my_folder_methods class would inherit the Files methods.

In addition to defining new methods that are not supported by a parent file class, the routines for a child file class can override the implementation of methods defined in the parent class. For example, the Files class illustrated in FIG. 16 provides a "store" method. The Folder class inherits the store method. However, the implementation of the store method provided for the Files class may not be the implementation required to store folders. Therefore, the Folder class may provide its own implementation of the store method, thus overriding the implementation provided by the Files class.

Determining the Class of a File

When the file system is asked to perform an operation on a file, the file system invokes the routines that implement the requested operation for the particular class of file to which the file belongs. As mentioned above, that same operation may be implemented differently for different file classes when, for example, a subclass has overridden the implementation provided by its parent class. Thus, to ensure that the proper operation is performed, the file system must first identify the class of the file upon which the operation is to be performed.

For files already stored in the file system, the task of identifying the class of the files may be trivial. For example, in the embodiment illustrated in FIG. 17, the Files table 1702 includes a Class column that, for any given row, stores data indicating the class of file associated with that row. Thus, if a request is received for performing a "move" operation on File3, the Class column of row X3 may be inspected to determine that File3 is of type E-mail. Consequently, the E-mail implementation of "move" should be executed. The E-mail implementation of "move" would be the implementation provided for the E-mail file class if the E-mail file class overrides the implementation of its inherited "move" method. Otherwise, the E-mail implementation of "move" is the implementation that is inherited by the E-mail class.

The task of identifying the class of a file may be more difficult when the file is not already stored in the file system. For example, when the file system is asked to store a file that is not already in the file system, the file system cannot make the class determination by inspecting the files table. Under these conditions, various techniques may be used to identify the type of the file. According to one embodiment, the type of the file may be expressly provided in the file operation request. For example, if the request is made in response to a command issued through the command-line of an operating system, one of the command-line arguments may be used to indicate the file type of the file. For example, the command may be entered as: "move a:\mydocs\file2 c:\yourdocs/ class=document".

Another technique for determining the class of a file involves determining the class based on information contained in the name of the file. For example, all files with certain extensions (e.g. .doc .wpd .pwp, etc.) may all be treated as members of a particular file class (e.g. Document). Consequently, when the file system is asked to perform operations on those files, the method implementations associated with that particular file class are used.

Yet another technique for determining the class of a file involves determining the class based on the location of the file within the file system hierarchy. For example, all files created within a particular directory or set of directories may be presumed to belong to a particular file class, regardless of how the files are named. These and other techniques may be combined in a variety of ways. For example, a file with a particular extension may be treated as a member of a first class unless the file is stored in a directory associated with a second class. If the file is stored in the directory associated with the second class, then the file is treated as a member of the second class unless the file operation request explicitly identifies the file to be a member of another file class.

Hardware Overview

Figure 18:
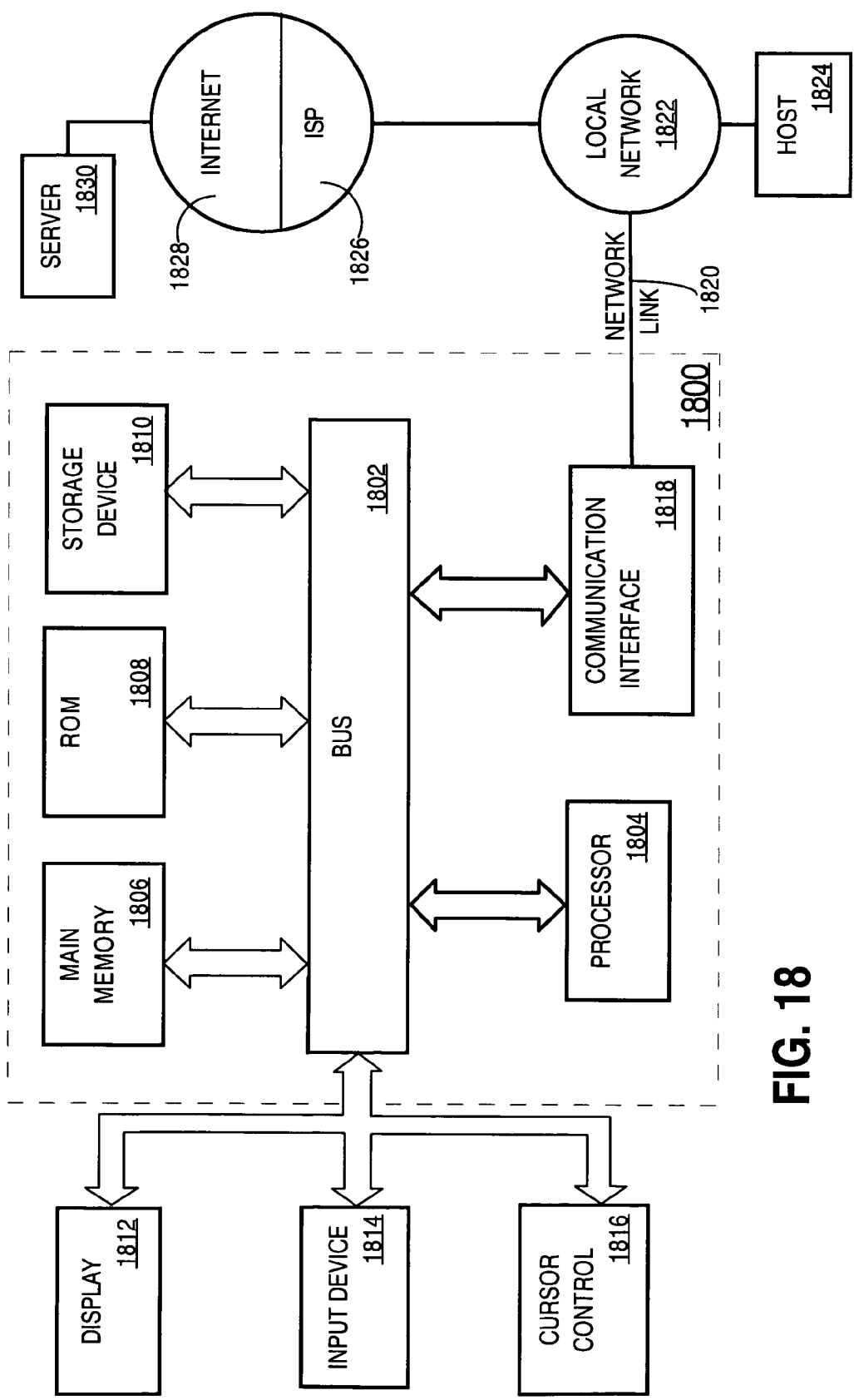
FIG. 18 is a block diagram that illustrates a computer system on which embodiments of the invention may be implemented.

FIG. 18 is a block diagram that illustrates a computer system 1800 upon which an embodiment of the invention may be implemented. Computer system 1800 includes a bus 1802 or other communication mechanism for communicating information, and a processor 1804 coupled with bus 1802 for processing information. Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

The invention is related to the use of computer system 1800 for implementing the techniques described herein. According to one embodiment of the invention, those techniques are implemented by computer system 1800 in response to processor 1804 executing one or more sequences of one or more instructions contained in main memory 1806. Such instructions may be read into main memory 1806 from another computer-readable medium, such as storage device 1810. Execution of the sequences of instructions contained in main memory 1806 causes processor 1804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1804 for execution. Such a medium may take many forms, including but not limited to, non-volatile media, volatile media, and transmission media. Non-volatile media includes, for example, optical or magnetic disks, such as storage device 1810. Volatile media includes dynamic memory, such as main memory 1806. Transmission media includes coaxial cables, copper wire and fiber optics, including the wires that comprise bus 1802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1804 for execution. For example, the instructions may initially be carried on a magnetic disk of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are exemplary forms of carrier waves transporting the information.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818. In accordance with the invention, one such downloaded application implements the techniques described herein.

The received code may be executed by processor 1804 as it is received, and/or stored in storage device 1810, or other non-volatile storage for later execution. In this manner, computer system 1800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing versions of files in a file system, the method comprising the steps of:
   providing a mechanism for tagging versions of files that are not to be overwritten;
   as part of an update to a first version of a file, performing the steps of:
      traversing one or more files in a file hierarchy to locate said first version of the file;
      determining whether any file in a plurality of files is tagged, wherein the plurality of files consists of the first version of the file and the one or more files traversed to locate said first version of the file;
      if one of the one or more traversed files is tagged or if the first version of the file is tagged, then storing a second version of the file while retaining said first version of the file; and
      if none of the one or more traversed files and the first version of the file is tagged, then storing said second version of the file and deleting said first version of the file;
   wherein the steps are performed on one or more computing devices.

2. The method of claim 1 wherein:
   the first version of said file is stored in a first version of a particular directory;
   the first version of the particular directory includes one or more files other than said file;
   the step of storing said second version of the file while retaining said first version of the file includes:
      creating a second version of said particular directory;
      establishing said one or more files as members of said second version of said particular directory; and
      establishing said second version of said file as a member of said second version of said particular directory while maintaining said first version of said particular file as a member of said first version of said particular directory.

3. A computer-implemented method for maintaining versions of files in a file system, the method comprising the steps of:
   as part of a change made to a first version of a file, determining whether a first set of criteria is satisfied;
   if the first set of criteria is satisfied, then
      creating and storing a second version of the file while retaining the first version of the file; and
      for each ancestor file, of one or more ancestor files above said file in a file hierarchy,
         determining whether said each ancestor file satisfies a second set of criteria;
         if said each ancestor file satisfies said second set of criteria, then creating and storing a new version of said each ancestor file;
         if said each ancestor file does not satisfy said second set of criteria, then not creating and storing a new version of said each ancestor file;
   wherein the steps are performed on one or more computing devices.

4. The method of claim 3 further comprising the steps of:
   receiving user input that specifies that one or more files in said file system are to be tagged;

storing data within said file system to indicate that said one or more files are tagged;

wherein the step of determining whether a first set of criteria is satisfied includes determining whether said first version of said file is tagged; and wherein said first set of criteria includes that said first version of said file is tagged.

5. The method of claim 3 further comprising the step of associating said file with a project, wherein said second set of criteria includes that said ancestor file belongs to said project.

6. The method of claim 5 wherein the file system includes one or more files that belong to a second project, the method further including the step of allowing a user to use a view of said file system in which files that belong to said project are seen as they existed at a first point in time, and the one or more files that belong to the second project are seen as they existed at a second point in time that is different from said first point in time.

7. The method of claim 6 further comprising the steps of:
through said view, performing a traversal of said file hierarchy based on links between files in said file system; and
during said traversal, following a link that has a source file and a target file only if said view specifies that said source file and said target file are to be seen as of a same point in time.

8. The method of claim 4 further comprising the step of deleting a third version of said file that is not tagged in response to creating said second version of the file.

9. The method of claim 8 wherein the step of deleting said third version of said file is performed in response to detecting that creation of said second version of the file would exceed a threshold maximum number of untagged versions of said file.

10. The method of claim 7, further comprising the step of marking links in said file system to indicate whether the source file and the target file associated with the links belong to the same project.

11. One or more storage media storing instructions for managing versions of files in a file system, wherein the instructions, when executed by one or more processors, cause:
providing a mechanism for tagging versions of files that are not to be overwritten;
as part of an update to a first version of a file, performing the steps of:
traversing one or more files in a file hierarchy to locate said first version of the file;
determining whether any file in a plurality of files is tagged, wherein the plurality of files consists of the first version of the file and the one or more files traversed to locate said first version of the file;
if one of the one or more traversed files is tagged or if the first version of the file is tagged, then storing a second version of the file while retaining said first version of the file; and
if none of the one or more traversed files and the first version of the file is tagged, then storing said second version of the file and deleting said first version of the file.

12. The one or more storage media of claim 11, wherein:
the first version of said file is stored in a first version of a particular directory;
the first version of the particular directory includes one or more files other than said file;
the step of storing said second version of the file while retaining said first version of the file includes:
creating a second version of said particular directory;
establishing said one or more files as members of said second version of said particular directory; and
establishing said second version of said file as a member of said second version of said particular directory while maintaining said first version of said particular file as a member of said first version of said particular directory.

13. One or more storage media storing instructions for maintaining versions of files in a file system, wherein the instructions, when executed by one or more processors, cause:
as part of a change made to a first version of a file, determining whether a first set of criteria is satisfied;
if the first set of criteria is satisfied, then
creating and storing a second version of the file while retaining the first version of the file; and
for each ancestor file, of one or more ancestor files above said file in a file hierarchy,
determining whether said each ancestor file satisfies a second set of criteria;
if said each ancestor file satisfies said second set of criteria, then creating and storing a new version of said each ancestor file;
if said each ancestor file does not satisfy said second set of criteria, then not creating and storing a new version of said each ancestor file.

14. The one or more storage media of claim 13, wherein the instructions, when executed by the one or more processors, further cause:
receiving user input that specifies that one or more files in said file system are to be tagged;
storing data within said file system to indicate that said one or more files are tagged;
wherein the step of determining whether a first set of criteria is satisfied includes determining whether said first version of said file is tagged; and
wherein said first set of criteria includes that said first version of said file is tagged.

15. The one or more storage media of claim 14, wherein the instructions, when executed by the one or more processors, further cause deleting a third version of said file that is not tagged in response to creating said second version of the file.

16. The one or more storage media of claim 15, wherein deleting said third version of said file is performed in response to detecting that creation of said second version of the file would exceed a threshold maximum number of untagged versions of said file.

17. The one or more storage media of claim 13, wherein the instructions, when executed by the one or more processors, further cause associating said file with a project, wherein said second set of criteria includes that said ancestor file belongs to said project.

18. The one or more storage media of claim 17, wherein the file system includes one or more files that belong to a second project, wherein the instructions, when executed by the one or more processors, further cause allowing a user to use a view of said file system in which files that belong to said project are seen as they existed at a first point in time, and the one or more files that belong to the second project are seen as they existed at a second point in time that is different from said first point in time.

19. The one or more storage media of claim 18, wherein the instructions, when executed by the one or more processors, further cause:
through said view, performing a traversal of said file hierarchy based on links between files in said file system; and during said traversal, following a link that has a source file and a target file only if said view specifies that said source file and said target file are to be seen as of a same point in time.

20. The one or more storage media of claim 19, wherein the instructions, when executed by the one or more processors, further cause marking links in said file system to indicate whether the source file and the target file associated with the links belong to the same project.

* * * * *

UNITED STATES PATENT AND TRADEMARK OFFICE
CERTIFICATE OF CORRECTION

| | | |
|---|---|---|
| PATENT NO. | : 8,335,775 B1 | Page 1 of 1 |
| APPLICATION NO. | : 09/571696 | |
| DATED | : December 18, 2012 | |
| INVENTOR(S) | : Sedlar et al. | |

It is certified that error appears in the above-identified patent and that said Letters Patent is hereby corrected as shown below:

Title Page, item (56);

On page 2, in column 2, under "Other Publications", line 6, delete "MacMillian" and insert -- MacMillan --, therefor.

In the Specifications:

In column 4, line 5, delete "though" and insert -- through --, therefor.

In column 4, line 27, delete "hierarchy" and insert -- hierarchy. --, therefor.

In column 7, line 18-25, delete "Each item ......... child item." and insert the same on Col. 7, Line 17 after "system." as a continuation of the same Paragraph.

In column 15, line 54, delete "more then" and insert -- more than --, therefor.

In column 19, line 16, delete "join" and insert -- joint --, therefor.

In column 23, line 59, delete "the an" and insert -- an --, therefor.

In column 29-30, line 58-67 and 1-3, delete "Fig. 13 shows.............UM 1326." and insert the same on Col. 29, line 57 as a continuation of the same paragraph.

In column 32, line 65, delete "that that" and insert -- that --, therefor.

In column 34, line 63, delete "ever time" and insert -- every time --, therefor.

In column 37, line 56, delete "belong" and insert -- belong to --, therefor.

Signed and Sealed this
Sixteenth Day of April, 2013

Teresa Stanek Rea
*Acting Director of the United States Patent and Trademark Office*